US012762158B2

(12) United States Patent
Zhang et al.

(10) Patent No.: US 12,762,158 B2
(45) Date of Patent: Oct. 13, 2026

(54) DATA DISCOVERY AND CLASSIFICATION USING SAMPLING-BASED SCANNING TECHNIQUES

(71) Applicant: Proofpoint, Inc., Sunnyvale, CA (US)

(72) Inventors: Yang Zhang, Fremont, CA (US); Ajay Agrawal, Bangalore (IN); Ravishankar Ganesh Ithal, Los Altos, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

(21) Appl. No.: 19/193,340

(22) Filed: Apr. 29, 2025

(65) Prior Publication Data

US 2025/0258840 A1 Aug. 14, 2025

Related U.S. Application Data

(63) Continuation of application No. 18/754,643, filed on Jun. 26, 2024, now Pat. No. 12,314,288.

(30) Foreign Application Priority Data

Jul. 28, 2023 (IN) ............................ 202311050874

(51) Int. Cl.
*G06F 16/28* (2019.01)
*H04L 67/10* (2022.01)

(52) U.S. Cl.
CPC ............ *G06F 16/285* (2019.01); *H04L 67/10* (2013.01)

(58) Field of Classification Search
None
See application file for complete search history.

(56) References Cited

U.S. PATENT DOCUMENTS

| | | | | |
|---|---|---|---|---|
| 7,593,904 | B1 * | 9/2009 | Kirshenbaum | G06Q 10/10 706/20 |
| 10,055,481 | B2 * | 8/2018 | Ideses | G06N 20/00 |
| 10,140,343 | B2 * | 11/2018 | Parikh | G06F 16/285 |
| 10,505,825 | B1 * | 12/2019 | Bettaiah | G06F 16/24578 |
| 11,182,691 | B1 * | 11/2021 | Zhang | G06N 20/20 |
| 11,227,237 | B2 * | 1/2022 | Baron | G06Q 10/02 |
| 11,501,112 | B1 * | 11/2022 | Oliner | G06F 16/907 |
| 11,574,074 | B2 * | 2/2023 | Koduri | G06F 16/24578 |
| 11,748,382 | B2 * | 9/2023 | Saillet | G06N 7/01 707/737 |

(Continued)

*Primary Examiner* — Eliyah S. Harper

(74) *Attorney, Agent, or Firm* — FP Patents; Sikander M. Khan; Chris Volkmann

(57) ABSTRACT

The technology disclosed herein relates to data discovery in computing environments, that provide access to data. In one example, a computer-implemented method includes identifying a first sampling criterion used for classification of a data store with respect to a target data type during a previous scan of the data store. The data store stores a set of data objects. The method includes selecting a second sampling criterion, from a plurality of sampling criteria, based on the first sampling criterion, and deploying one or more scanners configured to select a subset of data objects, from the set of data objects stored in the data store, based on the second sampling criterion. The subset comprises some, but not all, of the set of data objects. The method includes generating a classification result based on a number of instances of the target data type in the subset of data objects.

20 Claims, 21 Drawing Sheets

(56) References Cited

U.S. PATENT DOCUMENTS

| | | | | |
|---|---|---|---|---|
| 2009/0240729 | A1* | 9/2009 | Zwol | G06F 16/285 707/E17.046 |
| 2017/0004413 | A1* | 1/2017 | Flores | G06F 16/2365 |
| 2017/0098172 | A1* | 4/2017 | Ellenbogen | G06N 3/10 |
| 2019/0206563 | A1* | 7/2019 | Shelton, IV | G16H 50/20 |
| 2019/0339688 | A1* | 11/2019 | Cella | H04L 67/12 |
| 2020/0057864 | A1 | 2/2020 | Parthasarathy | |
| 2021/0117232 | A1* | 4/2021 | Sriharsha | G06F 9/544 |
| 2021/0117868 | A1* | 4/2021 | Sriharsha | G06N 20/20 |
| 2021/0342836 | A1* | 11/2021 | Cella | G06N 20/00 |
| 2022/0043913 | A1* | 2/2022 | Keith, Jr. | G06F 21/316 |
| 2022/0249097 | A1* | 8/2022 | Shelton, IV | G16H 50/20 |
| 2022/0366494 | A1* | 11/2022 | Cella | G06N 3/006 |
| 2023/0099403 | A1* | 3/2023 | Ithal | H04L 63/102 707/737 |
| 2024/0152494 | A1* | 5/2024 | Hampp-Bahnmueller | G06F 16/215 |

* cited by examiner

DATA DISCOVERY AND CLASSIFICATION USING SAMPLING-BASED SCANNING TECHNIQUES

CROSS-REFERENCE TO RELATED APPLICATIONS

The present application is a continuation of and claims priority to U.S. patent application Ser. No. 18/754,643, filed Jun. 26, 2024, which is based on and claims the benefit of Indian Application No. 202311050874, filed Jul. 28, 2023; the contents of these applications are hereby incorporated by reference in their entirety.

FIELD OF THE TECHNOLOGY DISCLOSED

The technology disclosed generally relates to data discovery in computing environments, such as cloud environments, that provide access to storage resources that store data for users or other endpoints or systems. More specifically, but not by limitation, the present disclosure relates to improved systems and methods of data discovery in cloud or other computing environments for cloud security posture management (CSPM), cloud infrastructure entitlement management (CIEM), cloud-native application protection platform (CNAPP), cloud-native configuration management database (CMDB), and/or data security posture management (DSPM).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

There are many types of computing environments that provide data storage resources for organizations or other end users. Cloud computing, for example, provides on-demand availability of computer resources, such as data storage and compute resources, often without direct active management by users. Thus, a cloud environment can provide computation, software, data access, and storage services that do not require end-user knowledge of the physical location or configuration of the system that delivers the services. In various examples, remote servers can deliver the services over a wide area network, such as the Internet, using appropriate protocols, and those services can be accessed through a web browser or any other computing component.

Examples of cloud storage services include Amazon Web Services™ (AWS), Google Cloud Platform™ (GCP), and Microsoft Azure™, to name a few. Such cloud storage services provide on-demand network access to a shared pool of configurable resources. These resources can include networks, servers, storage, applications, services, etc. The end-users of such cloud services often include organizations that have a need to store sensitive and/or confidential data, such as personal information, financial information, medical information. Such information can be accessed by any of a number of users through permissions and access control data assigned or otherwise defined through administrator accounts.

The discussion above is merely provided for general background information and is not intended to be used as an aid in determining the scope of the claimed subject matter.

SUMMARY

The technology disclosed relates to data discovery in computing environments, such as cloud environments, that provide access to storage resources that store data for users or other endpoints or systems. The data discovery can identify sensitive and/or private data (or information), which can be used for data posture analysis and management. In one example, a computer-implemented method for classifying a data store in a computing environment includes identifying a first sampling criterion used for classification of the data store with respect to a target data type during a previous scan of the data store. The data store stores a set of data objects. The method also includes selecting a second sampling criterion, from a plurality of sampling criteria, based on the first sampling criterion used during the previous scan, and deploying one or more scanners configured to select a subset of data objects, from the set of data objects stored in the data store, based on the second sampling criterion. The subset comprises some, but not all, of the set of data objects. The method also includes generating a classification result based on a number of instances of the target data type in the subset of data objects and performing a computing action based on the classification result.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIGS. 8-1 and 8-2 (collectively referred to as FIG. 8) provide a flow diagram illustrating one example of infrastructure analysis and query execution.

FIGS. 10-1 and 10-2 (collectively referred to as FIG. 10) provide a flow diagram of an example operation of infrastructure posture analysis using incremental change detection.

DETAILED DESCRIPTION

Figure 1:
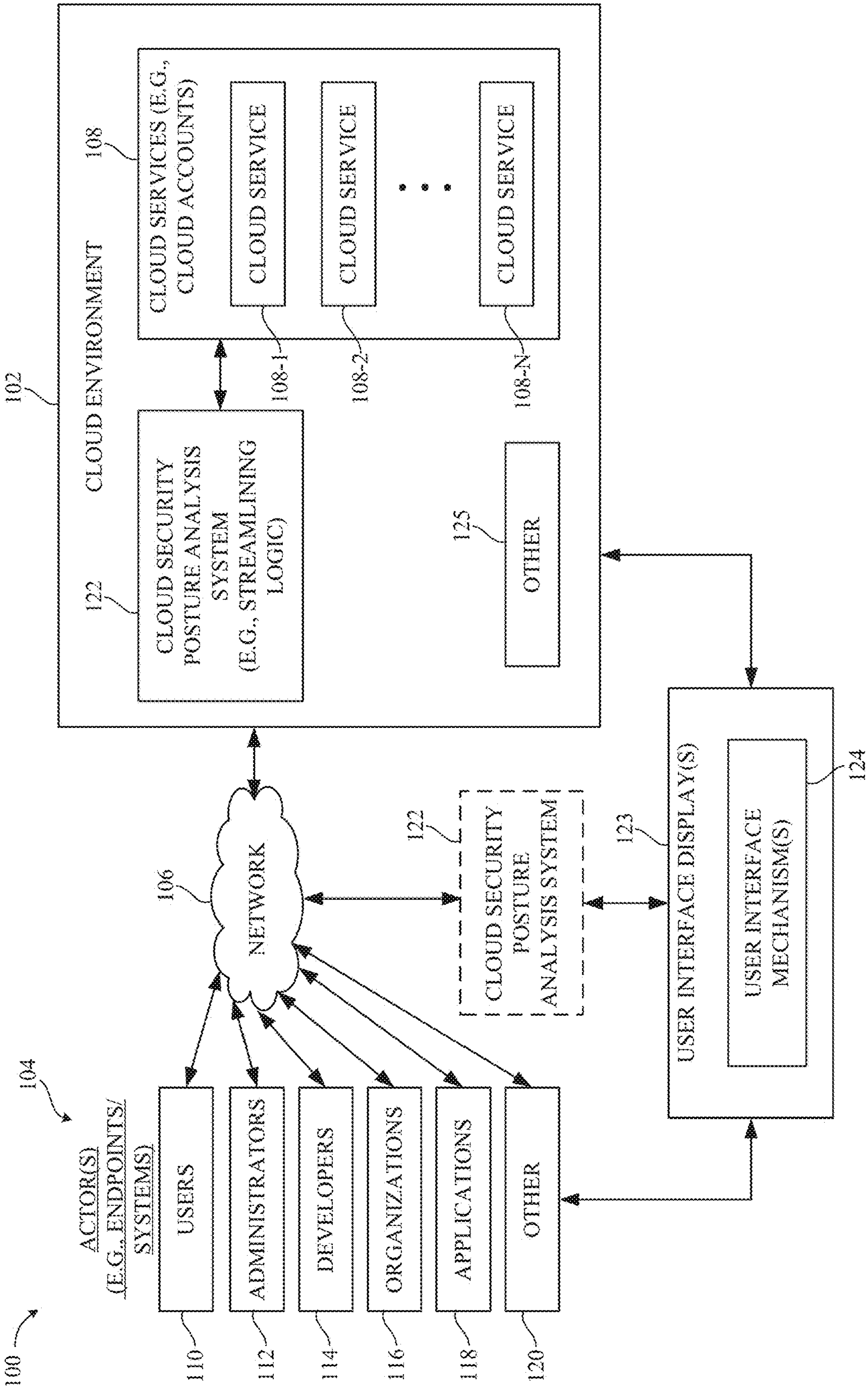
FIG. 1 is a block diagram illustrating one example of a cloud architecture.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

As noted above, computing environments, such as cloud environments and/or on-premise environments, are used by organizations or other end-users to store a wide variety of different types of information in many contexts and for many uses. This data can often include sensitive and/or confidential information, and can be the target for malicious activity such as acts of fraud, privacy breaches, data theft, etc. These risks can arise from individuals that are both inside the organization as well as outside the organization.

With the growing need to detect and prevent policy violations related to the user, storage, or transmission of sensitive and/or private information, data security and sensitive have become increasingly crucial. To take proactive measures to safeguard sensitive and/or private information, these computing environments often include security infrastructure to enforce access control, data loss prevention, or other processes to secure data from potential vulnerabilities, such as unauthorized access or breaches. One approach to data posture analysis uses scanners (e.g., a computer program running on a physical or virtual machine) that are deployed to access and scan the data stores and detect sensitive and/or private data, or other target data of interest.

In one approach, scanners are used to scan on-premise data stores and/or data stores in a cloud environment, such as in an organization's cloud accounts, data warehouses, and/or software as a service (SaaS) applications. However, when the data stores being scanned contain large volumes of information, the scanning process can be time-consuming and computationally expensive. Further, that approach is often not scalable as data stores are added and/or grow in size.

The present technology relates to data discovery in computing environments, such as cloud environments, that provide access to storage resources that store data for users or other endpoints or systems. The described technology can reduce the time and resources required to scan the data stores, while still providing accurate scan results for use in data store classification. Data discovery can identify sensitive and/or private data (or information), which can be used for data posture analysis and management. In one example, the disclosed technology receives a control input identifying a sampling criterion for classifying a data store storing a set of data objects in a computing environment as corresponding to a target data type and deploys one or more scanners configured to select a representative subset of data objects, from the set of data objects, based on the sampling criterion. The representative subset of data objects comprising some, but not all, of the set of data objects. A scanner result generated by the one or more scanners is received that represents detected instances, in the representative subset of data objects, of one or more pre-defined data patterns of the target data type. A classification result is generated based on a comparison of the number of detected instances of the one or more pre-defined data patterns to a threshold. The classification result represents a classification of the data store as having correspondence to the target data type. A computing action is performed based on the classification result. In one example, the classification of the data store can be utilized to update an infrastructure graph, that graph assets in the cloud environment.

FIG. 1 is a block diagram illustrating one example of a cloud architecture 100 in which a cloud environment 102 is accessed by one or more actors 104 through a network 106, such as the Internet or other wide area network. Cloud environment 102 includes one or more cloud services 108-1, 108-2, 108-N, collectively referred to as cloud services 108. As noted above, cloud services 108 can include cloud storage services such as, but not limited to, AWS, GCP, Microsoft Azure, to name a few.

Further, cloud services 108-1, 108-2, 108-N can include the same type of cloud service, or can be different types of cloud services, and can be accessed by any of a number of different actors 104. For example, as illustrated in FIG. 1, actors 104 include users 110, administrators 112, developers 114, organizations 116, and/or applications 118. Of course, other actors 120 can access cloud environment 102 as well.

Architecture 100 includes a cloud security posture analysis system 122 configured to access cloud services 108 to identify and analyze cloud infrastructure and data security posture within cloud environment 102. Examples of system 122 are discussed in further detail below. Briefly, however, system 122 is configured to access cloud services 108 and identify cloud infrastructure assets, such as by identifying connected resources, entities, actors, etc. within those cloud services, and to identify risks and violations against access to sensitive information. As shown in FIG. 1, system 122 can reside within cloud environment 102 or outside cloud environment 102, as represented by the dashed box in FIG. 1. Of course, system 122 can be distributed across multiple items inside and/or outside cloud environment 102.

Users 110, administrators 112, developers 114, or any other actors 104, can interact with cloud environment 102 through user interface displays 123 having user interface mechanisms 124. For example, a user can interact with user interface displays 123 provided on a user device (such as a mobile device, a laptop computer, a desktop computer, etc.) either directly or over network 106. Cloud environment 102 can include other items 125 as well.

Figure 2:
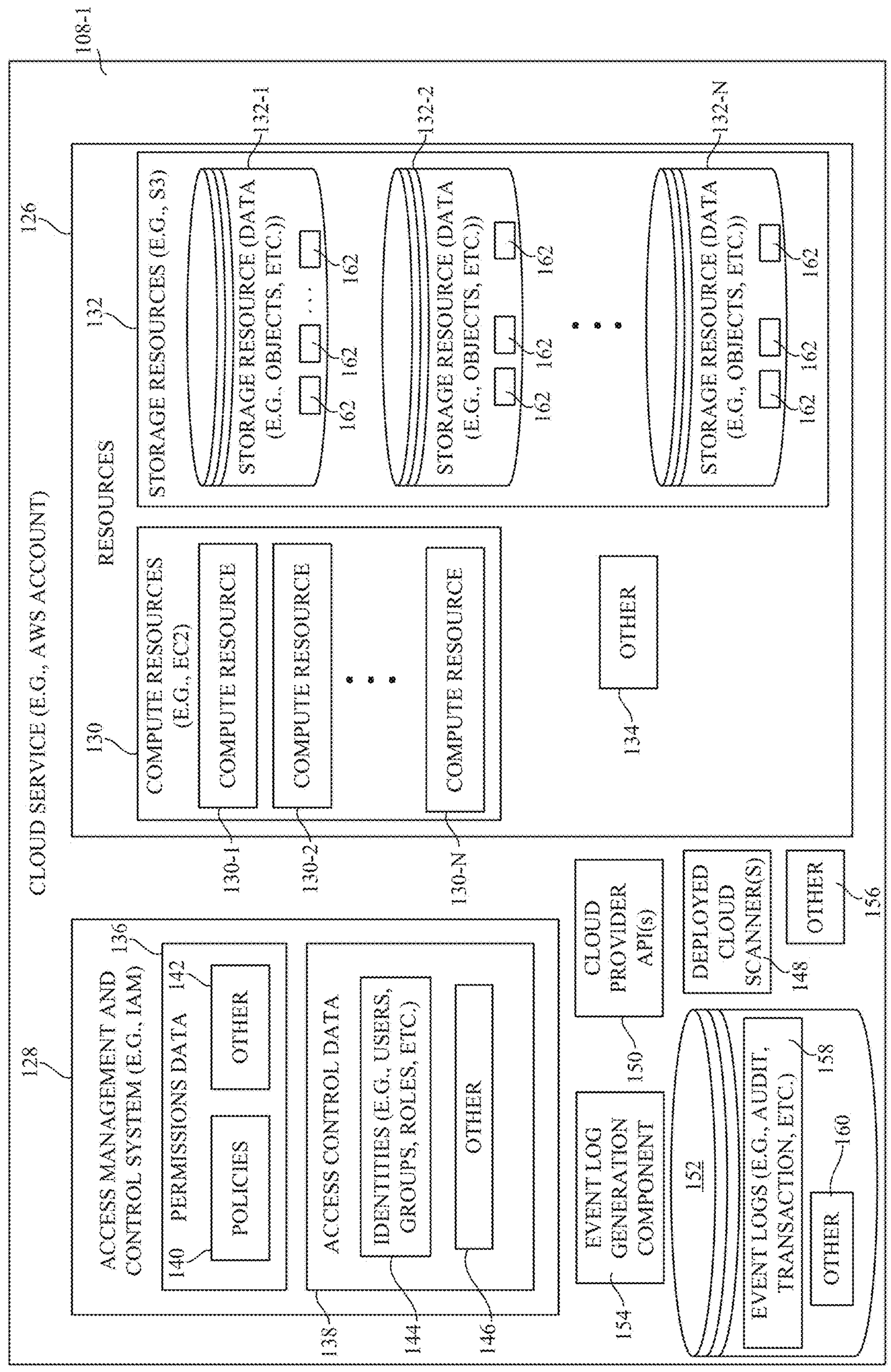
FIG. 2 is a block diagram illustrating one example of a cloud service.

FIG. 2 is a block diagram illustrating one example of cloud service 108-1. For the sake of the present discussion, but not by limitation, cloud service 108-1 will be discussed in the context of an account within AWS. Of course, other types of cloud services and providers are within the scope of the present disclosure.

Cloud service 108-1 includes a plurality of resources 126 and an access management and control system 128 configured to manage and control access to resources 126 by actors 104. Resources 126 include compute resources 130, storage resources 132, and can include other resources 134. Storage resources 132 can include one or more data stores to be scanned, as discussed below. As used herein, the term "data store" refers to a physical and/or virtual repository for storing data, such as one or more datasets. The data stored in a data store can be located on one or more hardware devices, such as one or more servers, which can be local or remote from one another. In one example, a data store includes one or more database. An example database includes a collection of data that is managed by a database management system (DBMS).

A virtual data store includes, in one example, a storage system that is abstracted from physical hardware. Therefore, instead of directly accessing physical disks or servers, the virtual data store operates on logical representations of data that can be distributed across various physical devices or locations. Virtual data stores are often implemented in virtualized or cloud environments where data is managed and accessed through software-defined infrastructure rather than physical hardware. Examples of virtual data stores include virtualized file systems, cloud storage services, and database systems deployed in virtualized environments.

Compute resources 130 include a plurality of individual compute resources 130-1, 130-2, 130-N, which can be the same and/or different types of compute resources. In the present example, compute resources 130 can include elastic compute resources, such as elastic compute cloud (AWS EC2) resources, AWS Lambda, etc.

An elastic compute cloud (EC2) is a cloud computing service designed to provide virtual machines called instances, where users can select an instance with a desired amount of computing resources, such as the number and type of CPUs, memory and local storage. An EC2 resource allows users to create and run compute instances on AWS, and can use familiar operating systems like Linux, Windows, etc. Users can select an instance type based on the memory and computing requirements needed for the application or software to be run on the instance.

AWS Lambda is an event-based service that delivers short-term compute capabilities and is designed to run code without the need to deploy, use or manage virtual machine instances. An example implementation is used by an organization to address specific triggers or events, such as database updates, storage changes or custom events generated from other applications. Such a compute resource can include a server-less, event-driven compute service that allows a user to run code for many different types of applications or backend services without provisioning or managing servers.

Storage resources 132 are accessible through compute resources 130, and can include a plurality of storage resources 132-1, 132-2, 132-N, which can be the same and/or different types of storage resources. A storage resource 132 can be defined based on object storage. For example, AWS Simple Storage Service (S3) provides highly-scalable cloud object storage with a simple web service interface. An S3 object can contain both data and metadata, and objects can reside in containers called buckets. Each bucket can be identified by a unique user-specified key or file name. A bucket can be a simple flat folder without a file system hierarchy. A bucket can be viewed as a container (e.g., folder) for objects (e.g., files) stored in the S3 storage resource.

Compute resources 130 can access or otherwise interact with storage resources 132 through network communication paths based on permissions data 136 and/or access control data 138. System 128 illustratively includes identity and access management (IAM) functionality that controls access to cloud service 108-1 using entities (e.g., IAM entities) provided by the cloud computing platform.

Permissions data 136 includes policies 140 and can include other permissions data 142. Access control data 138 includes identities 144 and can include other access control data 146 as well. Examples of identities 144 include, but are not limited to, users, groups, roles, etc. In AWS, for example, an IAM user is an entity that is created in the AWS service and represents a person or service who uses the IAM user to interact with the cloud service. An IAM user provides the ability to sign into the AWS management console for interactive tasks and to make programmatic requests to AWS services using the API, and includes a name, password, and access keys to be used with the API. Permissions can be granted to the IAM user to make the IAM user a member of a user group with attached permission policies. An IAM user group is a collection of IAM users with specified permissions. Use of IAM groups can make management of permissions easier for those users. An IAM role in AWS is an IAM identity that has specific permissions, and has some similarities to an IAM user in that the IAM role is an AWS identity with permission policies that determine what the identity can and cannot do in AWS. However, instead of being uniquely associated with one person, a role is intended to be assumable by anyone who needs it. Roles can be used to delegate access to users, applications, and/or services that don't normally have access to the AWS resources. Roles can be used by IAM users in a same AWS account and/or in different AWS accounts than the role. Also, roles can be used by compute resources 130, such as EC2 resources. A service role is a role assumed by a service to perform actions in an account on behalf of a user. Service roles include permissions required for the service to access the resources needed by the service. Service roles can vary from service to service. A service role for an EC2 instance, for example, is a special type of service role that an application running on an EC2 instance can assume to perform actions.

Policies 140 can include identity-based policies that are attached to IAM identities can grant permissions to the identity. Policies 140 can also include resource-based policies that are attached to resources 126. Examples include S3 bucket policies and IAM role trust policies. An example trust policy includes a JSON policy document that defines the principles that are trusted to assume a role. In AWS, a policy is an object that, when associated with an identity or resource, defines permissions of the identity or resource. AWS evaluates these policies when an IAM principal user or a role) makes a request. Permissions in the policy determine whether the request is allowed or denied. Policies are often stored as JSON documents that are attached to the IAM identities (user, groups of users, role).

A permissions boundary is a managed policy for an IAM identity that defines the maximum permissions that the identity-based policies can grant to an entity, but does not grant the permissions. Further, access control lists (ACLs) control which principles in other accounts can access the resource to which the ACL is attached. ACLs can be similar to resource-based policies. In some implementations of the technology disclosed, the terms "roles" and "policies" are used interchangeably.

Cloud service 108-1 includes one or more deployed cloud scanners 148, cloud provider application programming interface(s) (APIs) 150, one or more data stores 152, an event log generation component 154, and can include other items 156 as well. Cloud scanner 148 run locally on the cloud-based services and the server systems, and can utilize elastic compute resources, such as, but not limited to, AWS Lambda resources. Cloud scanner 148 is configured to access and scan the cloud service 108-1 on which the scanner is deployed. Examples are discussed in further detail below. Briefly, however, a scanner accesses the data stored in storage resources 132, permissions data 136, and access control data 138 to identify particular data patterns (such as, but not limited to, sensitive string patterns) and traverse or trace network communication paths between pairs of compute resources 130 and storage resources 132. The results of the scanner can be utilized to identify subject vulnerabilities, such as resources vulnerable to a breach attack, and to construct a cloud attack surface graph or other data structure that depicts propagation of a breach attack along the network communication paths.

Given a graph of connected resources, such as compute resources 130, storage resources 132, etc., entities (e.g., accounts, roles, policies, etc.), and actors (e.g., users, administrators, etc.), risks and violations against access to sensitive information is identified. A directional graph can be built to capture nodes that represent the resources and labels that are assigned for search and retrieval purposes. For example, a label can mark the node as a database or S3 resource, actors as users, administrators, developers, etc. Relationships between the nodes are created using information available from the cloud infrastructure configuration. For example, using the configuration information, system 122 can determine that a resource belongs to a given account and create a relationship between the policy attached to a resource and/or identify the roles that can be taken up by a user.

Event log generation component 154 is configured to generate event logs 158 (also referred to as activity logs), which record actions taken by a user, a role, or a cloud service as events. Component 154, in one example, is configured to deploy a database log generator on each of a plurality of databases 162 on storage resources 132. Databases 162 can store information in any of a plurality of different types of structures. For example, some or all databases 162 can comprise structured query language (SQL) databases that store and organize data in tables with related information. Each table consists of rows and columns, with each row representing a record and each column representing a specific data field. SQL databases allow users to manipulate data through SQL commands. Some examples of SQL databases include MySQL and PostgreSQL, to name a few. Alternatively, or in addition, some or all databases 162 can include non-SQL databases.

The respective event log generator, for each respective database 162, generates a respective database log in event logs 158. An example log includes log entries that record the database activities, events, etc. Example logs include, but not limited to, audit logs, transaction logs, etc.

As noted above, in some examples, resources 126 can include AWS EC2 and/or Lambda resources. Also, resources 126 can include AWS Instance Stores and/or AWS Elastic Block Store (EBS) volumes. An EBS volume is a durable, block-level storage device that can attach to a compute instance and used as a physical hard drive.

Resources 126 can also include an Azure blob identified by a resource URL syntax that assigns each resource a corresponding base URL.

A cloud storage service or cloud service provider (CSP) can include an organization which hosts services such as networking, software, servers, and/or infrastructure, among others. A CSP can also provide security for the provided services. The services provided by the CSP can relieve a client organization of individual responsibility of setting and managing infrastructure. Examples of CSPs include Amazon Web Services™, Microsoft Azure™, Salesforce™, Google Cloud Platform™, among others.

Cloud provider APIs 150 are configured to receive calls to access various components in cloud service 108. For example, cloud provider APIs 150 can access event logs 158 stored in data store 152. Data store 152 can also store other data items 160 as well.

A CSP generally provides a number of different interfaces to cloud-computing services, such as a service-provider interface to organizational clients for computing services. A CSP, for example, provides interfaces that allow cloud-computing clients to launch virtual machines, application programs, and other computational entities. A CSP can also provide user interface that allow claims to access, through the Internet, the services provided by the CSP. A client of the CSP can deploy web servers to access, modify, and sending information.

A cloud account provided by a CSP includes roles that determine user privileges users and what actions can be taken in the cloud account. An identify and access management (IAM) role is managed by the CSP and provides predefined roles that give granular access to specific CSP resources and prevent unwanted access to other CSP resources. For instance, an AWS IAM role includes an AWS identity with a set of permissions policies that each determine what the role can do within an AWS account. An IAM role can be assumed by anyone who needs to require the role.

Figure 3:
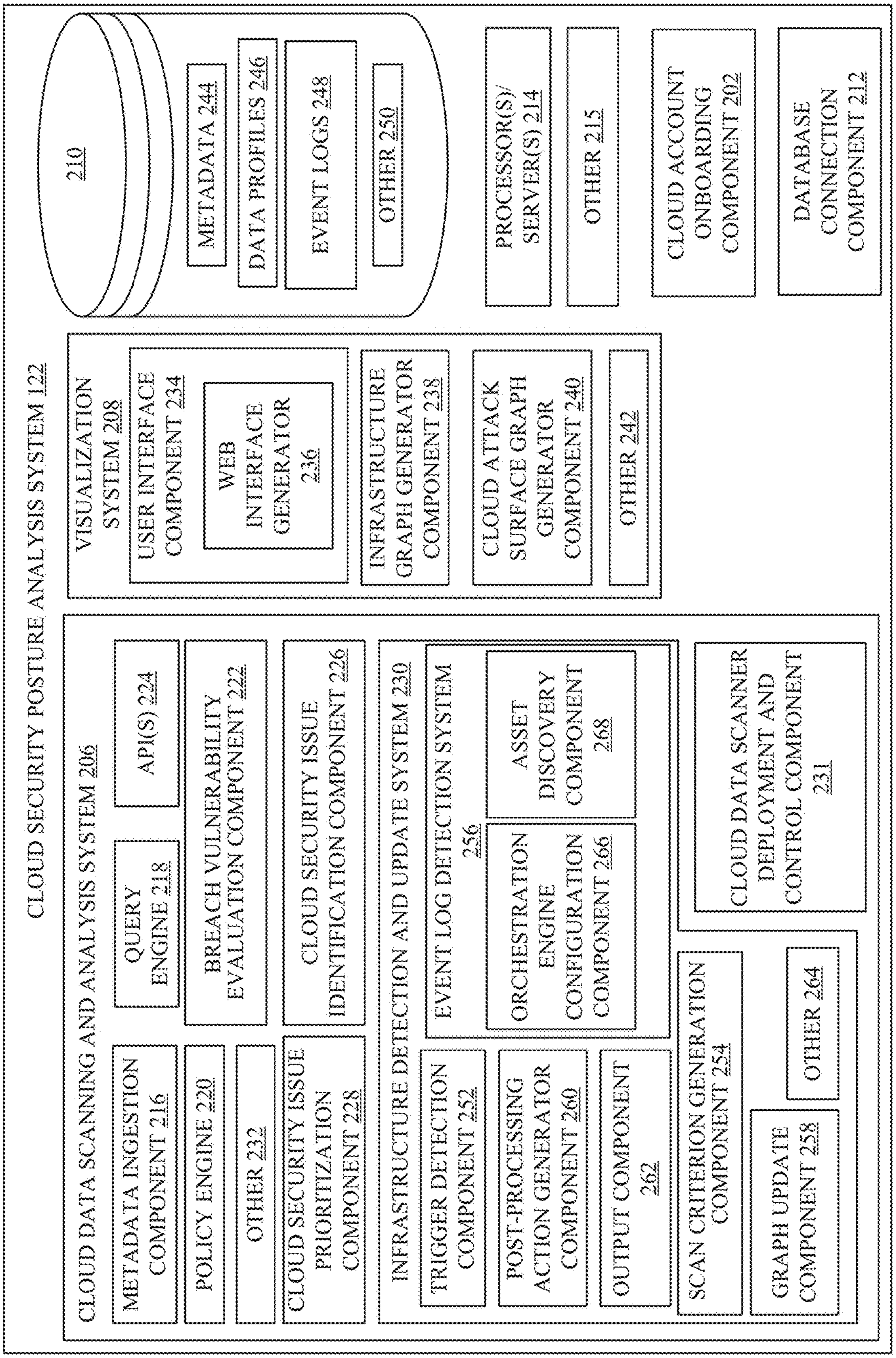
FIG. 3 is a block diagram illustrating one example of a cloud security posture analysis system.

FIG. 3 is a block diagram illustrating one example of cloud security posture analysis system 122. As noted above, system 122 can be deployed in cloud environment 102 and/or access cloud environment 102 through network 106 shown in FIG. 1.

System 122 includes a cloud account onboarding component 202, a cloud data scanning and analysis system 206, a visualization system 208, and a data store 210. System 122 can also include a database connection component 212, one or more processors or servers 214, and can include other items 215 as well.

Cloud account onboarding component 202 is configured to onboard cloud services 108 for analysis by system 122. After onboarding, system 206 is configured to deploy a cloud scanner (e.g., deployed cloud scanner(s) 148 shown in FIG. 2) to the cloud service. In one example, the deployed scanners are on-demand agent-less scanners configured to perform agent-less scanning within the cloud service. One example of an agent-less scanner does not require agents to be installed on each specific device or machine. The scanners operate on resources 126 and access management and control system 128 directly within the cloud service, and generate metadata that is returned to system 122. Thus, in one example, the actual cloud service data is not required to leave the cloud service for analysis.

Cloud data scanning and analysis system 206 includes a metadata ingestion component 216 configured to receive the metadata generated by the deployed cloud scanner(s) 148. System 206 also includes a query engine 218, a policy engine 220, a breach vulnerability evaluation component 222, one or more application programming interfaces (APIs) 224, a cloud security issue identification component 226, a cloud security issue prioritization component 228, an infrastructure detection and update system 230, a cloud data scanner deployment and control component 231, and can include other items 232 as well.

Query engine 218 is configured to execute queries against the received metadata and generated cloud security issue data. Policy engine 220 can execute security policies against the cloud data and breach vulnerability evaluation component 222 is configured to evaluate potential breach vulnerabilities in the cloud service. APIs 224 are exposed to users, such as administrators, to interact with system 122 to access the cloud security posture data.

Component 226 is configured to identify cloud security issues and component 228 can prioritize the identified cloud security issues based on any of a number of criteria.

Visualization system 208 is configured to generate visualizations of the cloud security posture from system 206. Illustratively, system 208 includes a user interface component 234 configured to generate a user interface for a user, such as an administrator. In the illustrated example, component 234 includes a web interface generator 236 configured to generate web interfaces that can be displayed in a web browser on a client device.

Visualization system 208 also includes an infrastructure graph generator component 238, a cloud attack surface graph generator component 240, and can include other items 242 as well. Infrastructure graph generator component 238 is configured to generate a graph or other representation of the relationships between resources 126 or other infrastructure assets such as privileges, roles, etc. For example, component 238 can generate a cloud infrastructure graph, such as a map, that graphically depicts pairs of compute resources and storage resources as nodes and network communication paths as edges between the nodes.

Cloud attack surface graph generator component 240 is configured to generate a surface graph or other representation of vulnerabilities of resources to a breach attack. In one example, the representation of vulnerabilities can include a cloud attack surface map that graphically depicts propagation of a breach attack along network communication paths as edges between nodes that represent the corresponding resources.

Data store 210 stores metadata 244 obtained by metadata ingestion component 216, sensitive data profiles 246, detected event logs 248, and can store other items 250 as well. Examples of sensitive data profiles 246 are discussed in further detail below. Briefly, however, sensitive data profiles 246 can identify target data patterns that are to be categorized as sensitive or conforming to a predefined pattern of interest. Sensitive data profiles 246 can be used as training data for data classification. Examples of data classification are discussed in further detail below. For instance, however, pattern matching can be performed based on the target data profiles. Illustratively, pattern matching can be performed to identify instances of data patterns corresponding to social security numbers, credit card numbers, other personal data, medical information, to name a few. In one example, artificial intelligence (AI) is utilized to perform named entity recognition (e.g., natural language processing modules can identify sensitive data, in various languages, representing names, company names, locations, etc.).

Database connection component 212 is configured to connect to, or access, databases in the data stores of the resources being analyzed by system 122. Examples are discussed in further detail below. Briefly, however, database connection component 212 can receive user access credentials, such as a username and password, for each database of a plurality of databases to be accessed in the cloud environment and scanned by the deployed scanners. In another example, database connection component 212 can be configured to connect to representations of the databases that are accessed using a different authentication requirement, than the databases themselves. For example, database connection component 212 can identify and connect to snapshots of the databases through cloud provider APIs 150, discussed above. Database connection component 212 can access event logs 158, for the identified databases, from data store 152.

Infrastructure detection and update system 230 includes a trigger detection component 252, a scan criterion generation component 254, an event log detection system 256, a graph update component 258, a post-processing action generator component 260, an output component 262, and can include other items 264 as well.

Operation of system 230 is discussed in further detail below. Briefly, however, trigger detection component 252 is configured to detect a triggering criterion corresponding to initiation of an update scan of the infrastructure posture of cloud environment 102. The update scan is configured to identify changes to the infrastructure posture that occurred subsequent to a previous scan and update performed by system 230. In this way, the trigger criterion can be based on a temporal criterion, such as the duration and/or end time of a prior scan.

Scan criterion generation component 254 is configured to generate one or more scan criterion, for example based on the temporal triggering criterion. Event log detection system 256 includes an orchestration engine configuration component 266 and an asset discovery component 268. System 256 can include other items as well.

Orchestration engine configuration component 266 configures an orchestration engine to deploy one or more micro services to analyze event logs (herein referred to as log analyzer microservices) and implement data scanner(s). For example, the event logs can be a plurality of database activity logs for a plurality of databases in cloud environment 102. Here, the orchestration engine deploys, in parallel, a plurality of microservices to analyze those logs.

An example orchestration engine includes a tool or platform that automates and manages the deployment, configuration, coordination, and monitoring of complex applications or services. The orchestration engine can provide a centralized control system that streamlines the management of multiple components and resources, such as containerized applications, across distributed systems. In addition, the orchestration engine can include features such as load balancing, automatic failover, and resource allocation to help ensure that the application is highly available and can scale dynamically to handle changing workloads. In one example, each microservice is configured to perform a specific function that is deployable and scalable independently of other services. The microservice(s) return analysis results to the orchestration engine, such as in the form of metadata from the event logs and/or metadata indicative of a scan of data objects in the data store.

Based on the results, graph update component 258 is configured to update the infrastructure graph, such as by adding nodes, adding edges, deleting nodes, deleting edges, or editing/changing existing nodes and/or edges in the graph. The updates can reflect, for example, changes to infrastructure assets, such as events that add, delete or change resources, such as compute resources (e.g., EC2 instances), storage resources (e.g., S3 instances), roles in the cloud environment, privileges, to name a few.

Output component 262 can output the analysis results to other systems. In one example, alerts or user interface displays, such as reports, can be provided to an administrator or other user.

Remedial action generator component 270 is configured to generate a remedial action that can be output to an administrator or user as a suggested action. Alternatively, or in addition, component 270 can generate control signals that perform the remedial action within the cloud environment. Examples are discussed in further detail below.

Figure 4:
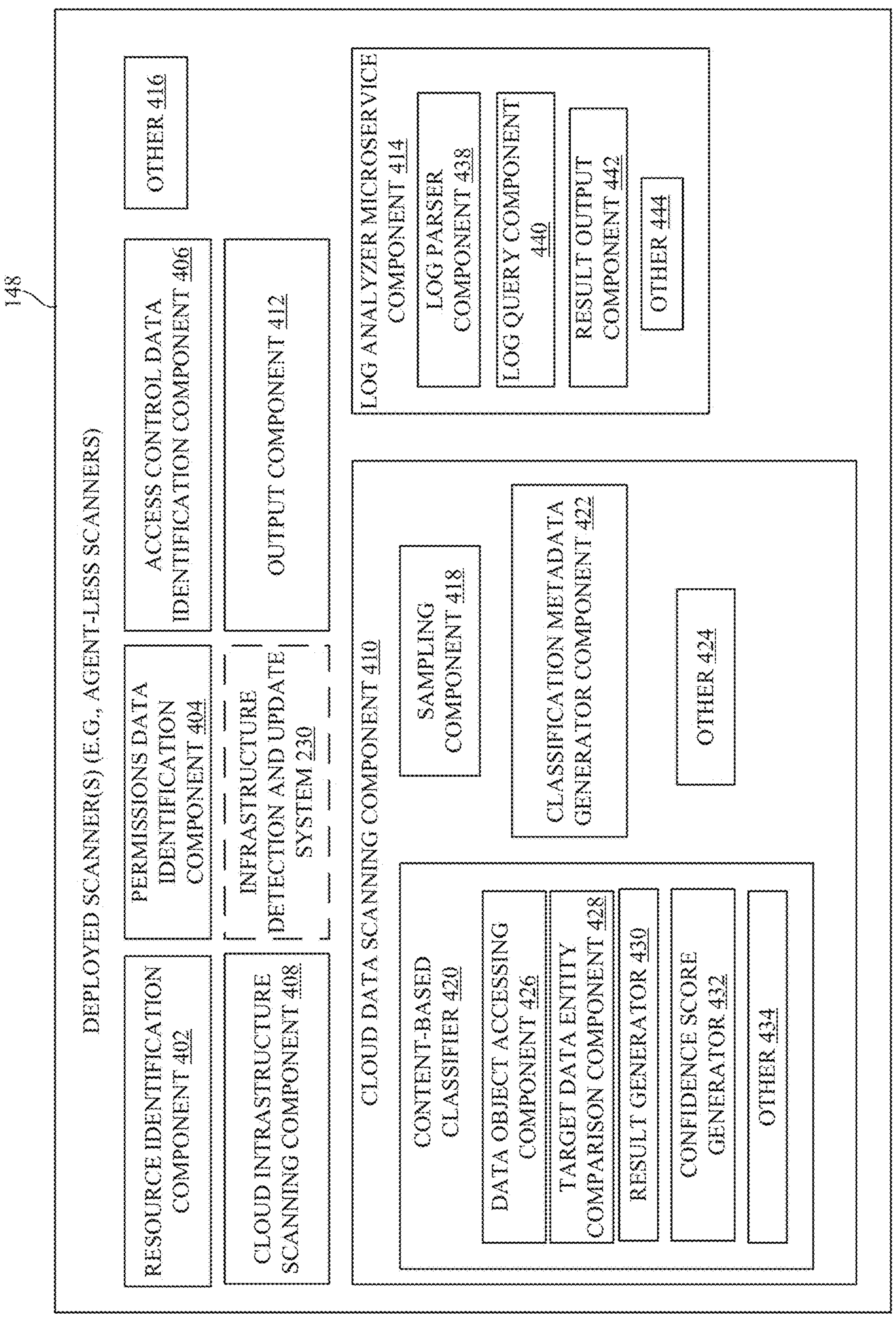
FIG. 4 is a block diagram illustrating one example of a deployed scanner.

FIG. 4 is a block diagram illustrating one example of a deployed scanner 148. Scanner 148 includes a resource identification component 402, a permissions data identification component 404, an access control data identification component 406, a cloud infrastructure scanning component 408, a cloud data scanning component 410, an output component 412, a log analyzer microservice component 414, and can include other items 416 as well. FIG. 4 also illustrates that some or all components of and/or functionality performed by system 230 can be on or otherwise associated with deployed scanner 148.

Resource identification component 402 is configured to identify the resources 126 within cloud service 108-1 (and/or other cloud services 108) and to generate corresponding metadata that identifies these resources. Permissions data identification component 404 identifies the permissions data 136 and access control data identification component 406 identifies access control data 138. Cloud infrastructure scanning component 408 scans the infrastructure of cloud service 108 to identify the relationships between resources 130 and 132 and cloud data scanning component 410 scans the actual data stored in storage resources 132. Output component 412 is configured to output the generated metadata and content-based classification results to cloud security posture analysis system 122.

The metadata generated by scanner 148 can indicate a structure of schema objects in a data store. For example, where the schema objects comprise columns in a data store having a tabular format, the returned metadata can include column names from those columns. A content-based data item classifier is configured to classify data items within the schema objects, based on content of those data items. Examples are discussed in further detail below.

Cloud data scanning component 410 includes a sampling component 418, a content-based classifier 420, a classification metadata generator component 422, and can include other items 424 as well. Sampling component 418 is configured to define or otherwise obtain a sampling criterion that is utilized for sampling a data store to be scanned. Using the sampling criterion, scanner 148 selects a representative subset of data objects in the data store to be utilized by scanner 148 in performing content-based classification. Operation of sampling component 418 is discussed in further detail below.

Content-based classifier 420 is configured to perform content-based classification to classify data objects (e.g., data files, etc.) in the data store. Content-based classifier 420 includes a data object accessing component 426, a target data entity comparison component 428, a result generator 430, a confidence score generator 432, and can include other items 434 as well. Data object accessing component 426 is configured to access the data objects.

Content-based classifier 420 can perform content-based classification using target data entity comparison component by comparing the data objects to predefined target data profiles (e.g., sensitive data profiles). The content-based classifier can be any of a wide variety of classifiers including, but not limited to, a rules-based classifier, a machine learned classifier (e.g., a deep learning system), a heuristics-based classifier, or other type of classifier or classification model.

An example classifier includes a classification engine that evaluates extracted content, extracted from the data objects. For example, a portion of content can be matched to a content rule if a characteristic of the content satisfies a condition of the content rule. For instance, a classifier can compare the extracted content to the target data profiles using one or more similarity measures. A similarity measure can be used by the classifier to determine whether a data item extracted from a content object is determined to match a given target data profile. Examples of similarity measures include, but are not limited to, k-gram overlap, edit distance, Cosine similarity, Manhatten distance, Euclidean distance, Levenshtein distance, to name a few.

Log analyzer microservice component 414 is configured to analyze one or more event logs to identify incremental changes to infrastructure assets. Component 414 includes a log analyzer microservice that is employed and managed by an orchestration engine, as discussed above. Component 414 includes a log parser component 438, a log query component 440, a result output component 442, and can include other items 444 as well.

Log parser component 438 is configured to parse event logs, such as database event logs in a given database, on which the scanner is deployed. The parsing can be done in any of a number of ways. In one example, log parser component 438 accesses each of a number of entries in the event log and identifies constituent data fields that identify various characteristics or parameters from a respective event or activity in the cloud environment. For example, the parsing can include an identification of what service (e.g., a resource or other asset) had a change, a time that the change occurred, what geographic region the change occurred in, what entity was involved in the change (e.g., a requestor identity), as well as any other attributes. These attributes can be returned as metadata by result output component 442.

Figure 5:
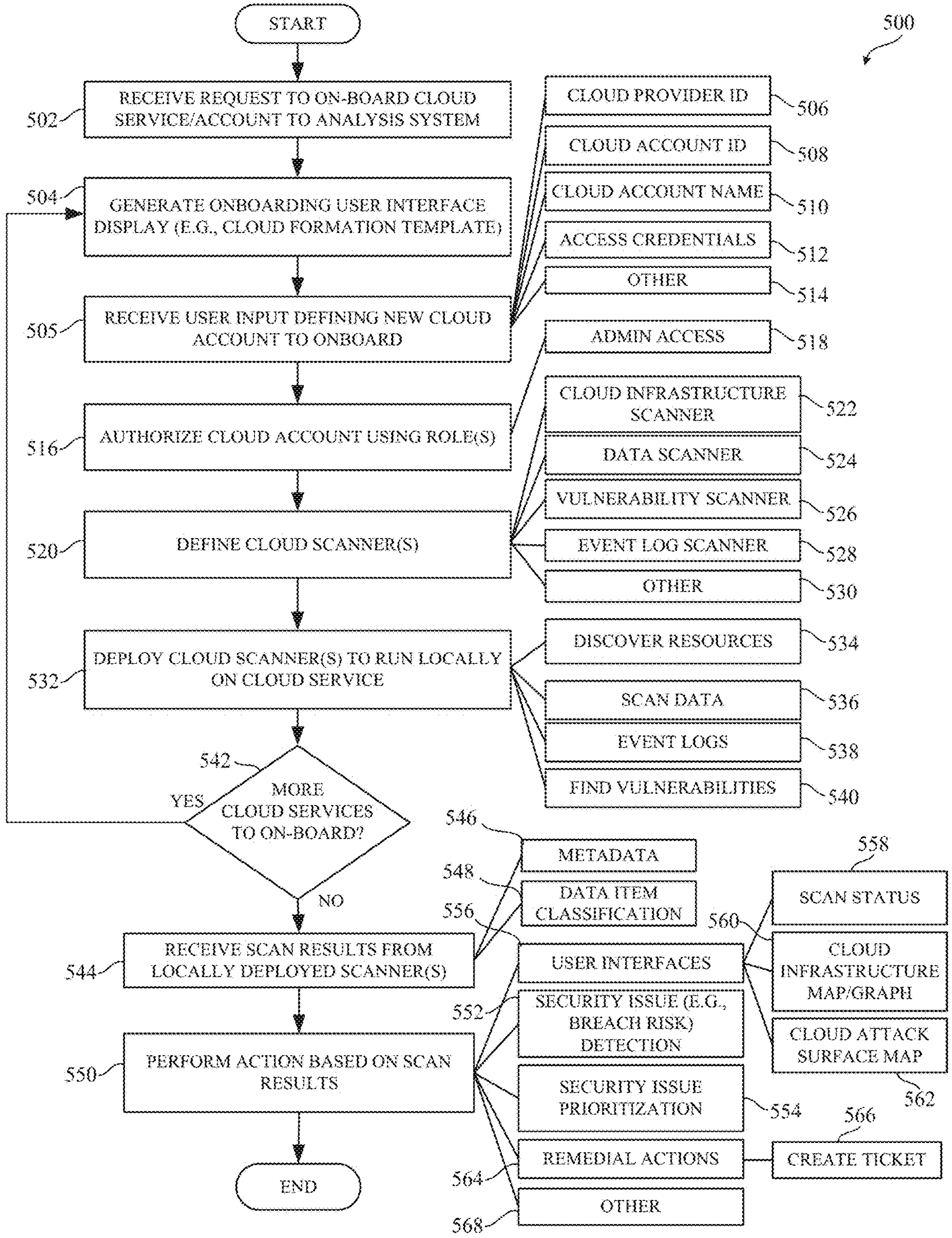
FIG. 5 is a flow diagram showing an example operation of on-boarding a cloud account and deploying one or more scanners.

FIG. 5 is a flow diagram 500 showing an example operation of system 122 in on-boarding a cloud account and deploying one or more scanners. At block 502, a request to on-board a cloud service to cloud security posture analysis system 122 is received. For example, an administrator can submit a request to on-board cloud service 108-1.

At block 504, an on-boarding user interface display is generated. At block 505, user input is received that defines a new cloud account to be on-boarded. The user input can define a cloud provider identification 506, a cloud account identification 508, a cloud account name 510, access credentials to the cloud account 512, and can include other input 514 defining the cloud account to be on-boarded.

At block 516, the cloud account is authorized using roles. For example, administrator access (block 518) can be defined for the cloud scanner using IAM roles. One or more cloud scanners are defined at block 520 and can include, but are not limited to, cloud infrastructure scanners 522, cloud data scanners 524, vulnerability scanners 526, event log scanners 528, or other scanners 530.

At block 532, the cloud scanners are deployed to run locally on the cloud service, such as illustrated in FIG. 2. The cloud scanners discover resources at block 534, scan data in the resources at block 536, event logs at block 538, and can find vulnerabilities at block 540. As discussed in further detail below, a vulnerability can be identified based on finding a predefined risk signature in the cloud service resources. The risk signatures can be queried upon, and define expected behavior within the cloud service and locate anomalies based on this data.

At block 542, if more cloud services are to be on-boarded, operation returns to block 504. At block 544, the scan results from the deployed scanners are received. As noted above, the scan results include metadata (block 546) and/or data item classifications (block 548) generated by the scanners running locally on the cloud service.

At block 550, one or more actions are performed based on the scan results. At block 552, the action includes security issue detection. For example, a breach risk on a particular resource (such as a storage resource storing sensitive data) is identified. At block 554, security issue prioritization can be performed to prioritize the detected security issues. Examples of security issue detection and prioritization are discussed in further detail below. Briefly, security issues can be detected by executing a query against the scan results using vulnerability or risk signatures.

The risk signatures identify criterion such as accessibility of the resources, access and/or permissions between resources, and data types in accessed data stores. Further, each risk signature can be scored and prioritized based on impact. For example, a risk signature can include weights indicative of likelihood of occurrence of a breach and impact if the breach occurs.

A risk signature can be defined based upon any of a wide variety of criteria. For example, a risk signature can identify one or more configurations or settings of compute resources 130. Examples include, but are not limited to, a configuration that indicates whether the compute resource provides accessibility to a particular type of data, such as confidential data, medical data, financial data, personal data, or any other type of private and/or sensitive content. In another example, a risk signature indicates that a compute resource is publicly accessible, includes a public Internet protocol (IP) address, or has IP forwarding enabled. In another example, a risk signature indicates that a compute resource has monitoring disabled, has no IAM role assigned to the compute resource, has backup disabled, data encryption disabled, and/or a low or short backup retention policy. Also, a risk signature can identify password policies set for the compute resource. For instance, a risk signature can indicate a lack of minimum password policies, such as no minimum password length, no requirement of symbols, lowercase letters, uppercase letters, numbers, or password reuse policy. Also, a risk criterion can indicate a location of the compute resource, such as whether the compute resource is located outside of a particular region.

Risk signatures can also indicate configurations and/or settings of storage resources 132. For example, the configurations and settings can indicate authentication or permissions enforced by the storage resource, such as whether authentication is required for read, write, delete, synchronization, or any other operation. Also, the risk signature can indicate whether multi-factor authentication is disabled for the storage resource, as well as a breadth of permissions grants (e.g., whether all authenticated users are granted permissions within the storage resource). Also, a risk signature can indicate whether encryption is enabled by default, a password policy enforced by the storage resource, whether the storage resource is anonymously accessible, publicly accessible, has a key management service disabled, has logging disabled, life cycle management disabled, whether the storage resource is utilized for website hosting, has geo-restriction disabled, or has backup functionality disabled. Also, the risk signature can indicate a type of data stored by the storage resource, such as the examples discussed above.

The action can further include providing user interfaces at block 556 that indicate the scan status (block 558), a cloud infrastructure representation (such as a map or graph) (block 560), and/or a cloud attack surface representation (map or graph) (block 562). The cloud attack surface representation can visualize vulnerabilities.

Remedial actions can be taken at block 564, such as creating a ticket (block 566) for a developer or other user to address the security issues. Of course, other actions can be taken at block 568. For instance, the system can make adjustments to cloud account settings/configurations to address/remedy the security issues.

Figure 6:
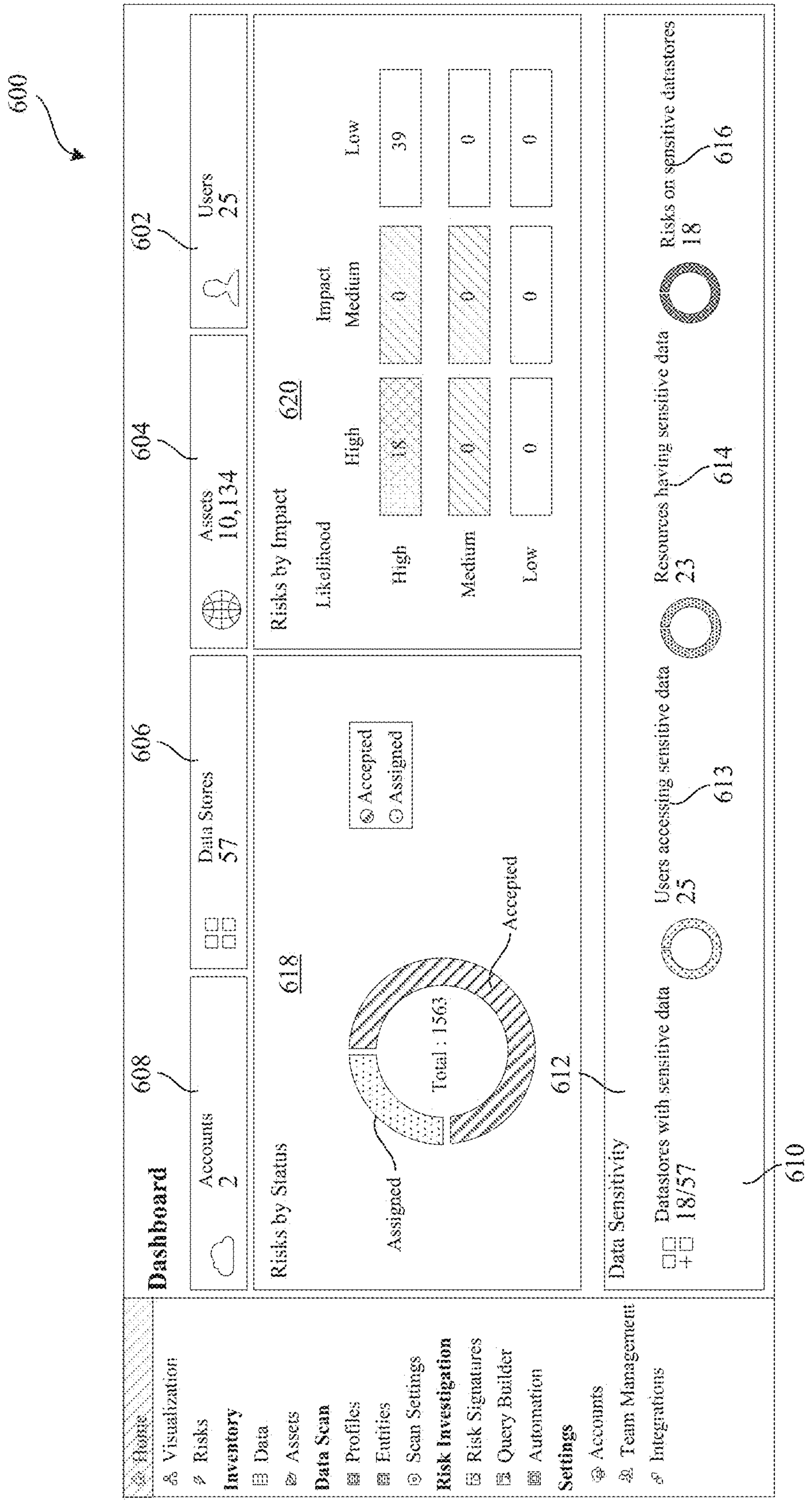
FIG. 6 illustrates one example of a user interface display having a dashboard representing on-boarded cloud service accounts.

FIG. 6 illustrates one example of a user interface display 600, that can be displayed at block 552. Display 600 provides a dashboard for a user which provides an overview of on-boarded cloud service accounts. The dashboard identifies a number of users 602, a number of assets 604, a number of data stores 606, and a number of accounts 608. A data sensitivity pane 610 includes a display element 612 that identifies a number of the data stores that include sensitive data, a display element 613 that identifies a number of users with access to the sensitive data, a display element 614 that identifies a number of resources having sensitive data, and a display element 616 that identifies a number of risks on the data stores having sensitive data. Further, graphs or charts can be generated to identify those risks based on factors such as status (display element 618) or impact (display element 620).

Display element 620 illustratively categorizes the risks based on impact as well as the likelihood of occurrence of those risks. Risk categorization is discussed in further detail below. Briefly, however, display element 620 stratifies one or more of breach likelihood scores or breach impact scores categories representing different levels of severity, such as high, medium, and low severity levels. In one example, display element 620 is color coded based on the degree of impact of the risk (e.g., high impact is highlighted in red, medium impact is highlighted in yellow, and low impact is highlighted in green).

Figure 7:
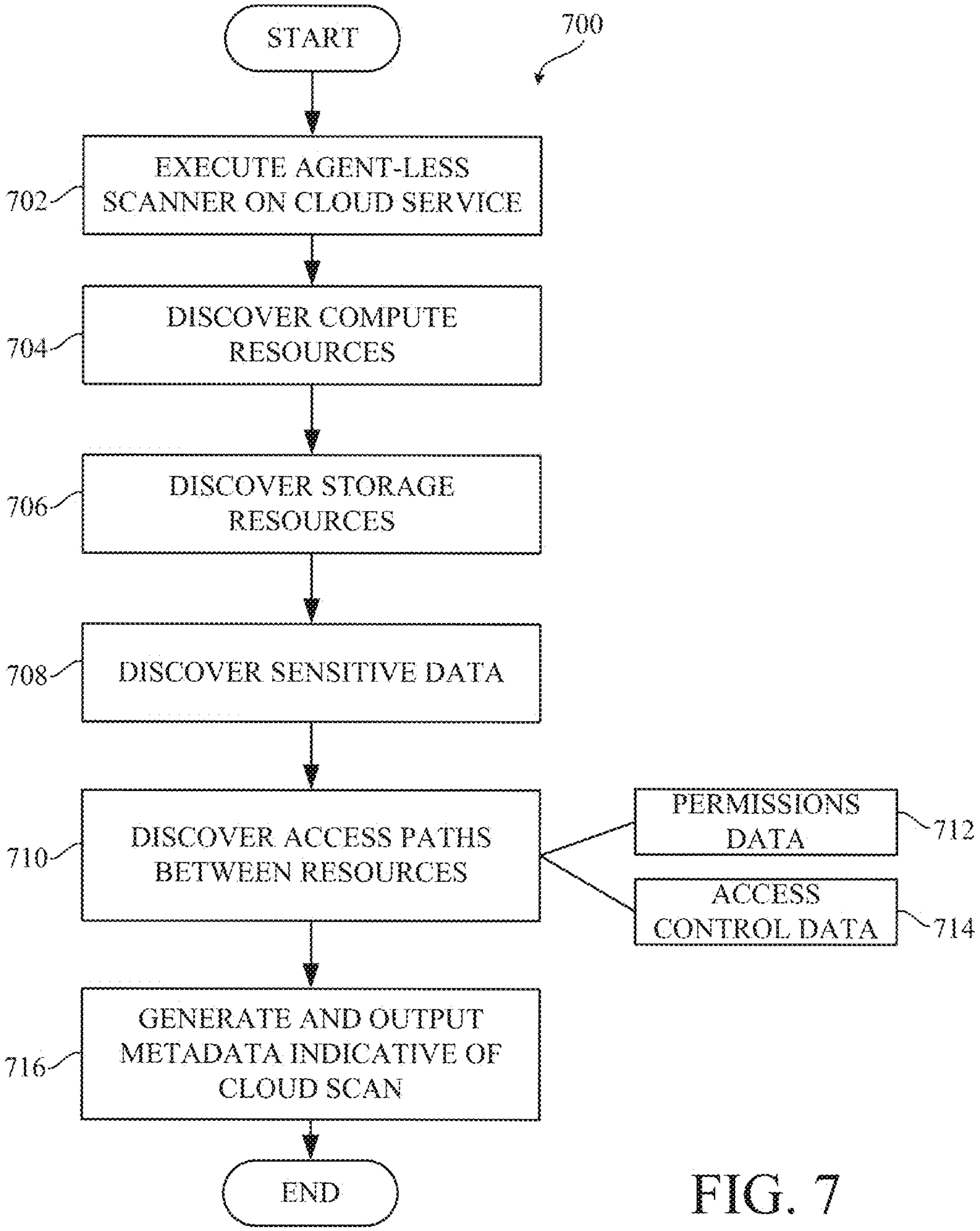
FIG. 7 is a flow diagram illustrating one example of cloud infrastructure scanning performed by a cloud scanner deployed in a cloud service.

FIG. 7 is a flow diagram 700 illustrating one example of cloud infrastructure scanning performed by cloud scanner 148 deployed in cloud service 108-1. At block 702, an agent-less scanner is executed on the cloud service. For example, a compute resource can utilize a serverless function to perform a scan on the cloud service.

At block 704, the scanner discovers the compute resources 130 and, at block 706, the storage resources 132. Sensitive data can be discovered at block 708. The agent-less scanner does not require a proxy or agent running in the cloud service, and can utilize server-less containers and resources to scan the documents and detect sensitive data. The data can be accessed using APIs associated with the scanners. The sensitive data can be identified using pattern matching, such as by querying the data using predefined risk signatures.

At block 710, access paths between the resources are discovered based on permissions data 136 (block 712), and/or access control data 138 (block 714). A rule processing engine, such as using JSON metadata, can be utilized to analyze the roles and policies, and can build access relationships between the nodes representing the resources. The policies can be decoded to get access type (allow, deny, etc.) and the policy can be placed in a node to link from a source to target node and create the access relationship. At block 716, metadata indicative of the scanning results is generated and outputted by metadata output component 272.

Figures 1, 8:
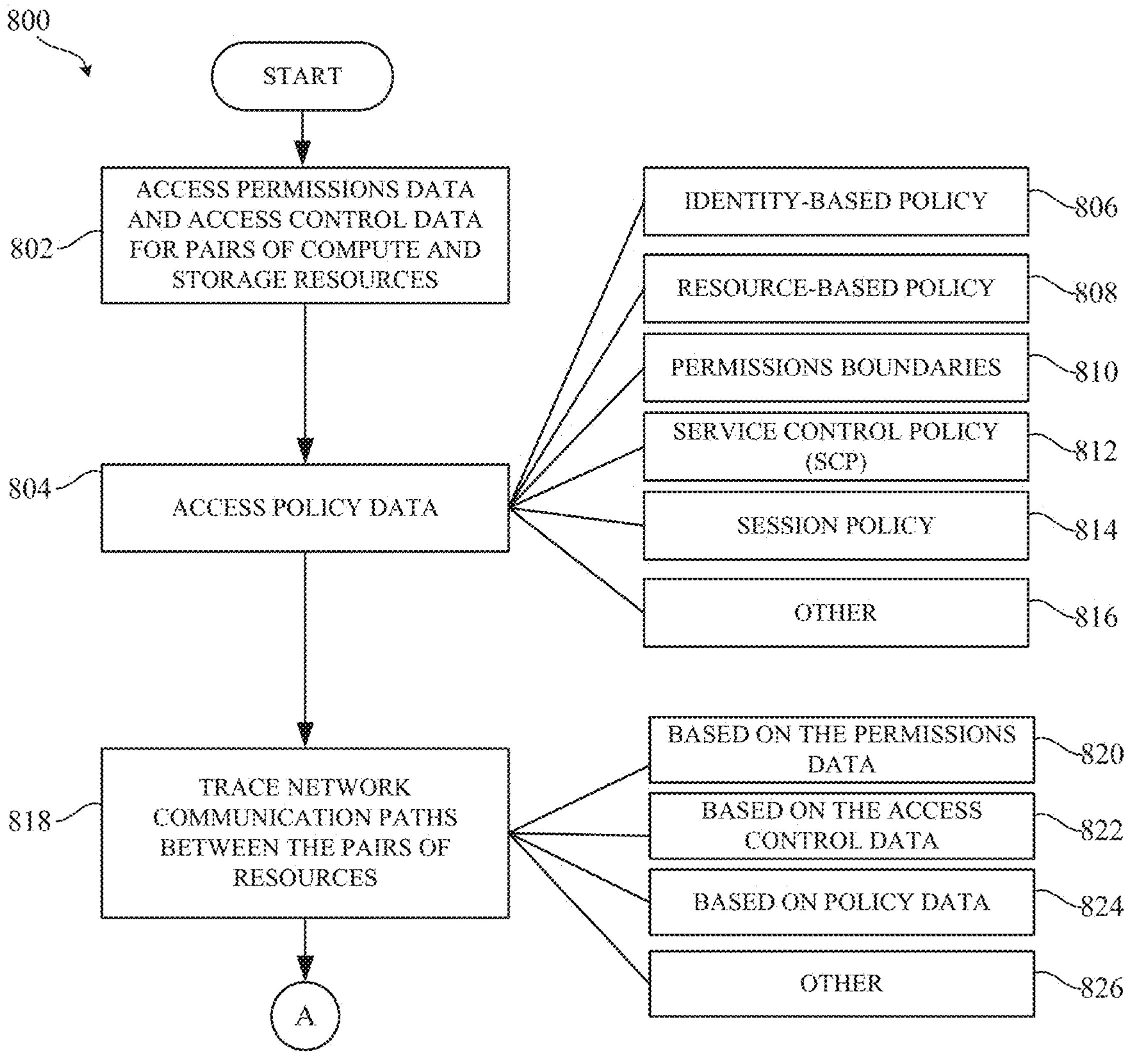
Figures 2, 8:
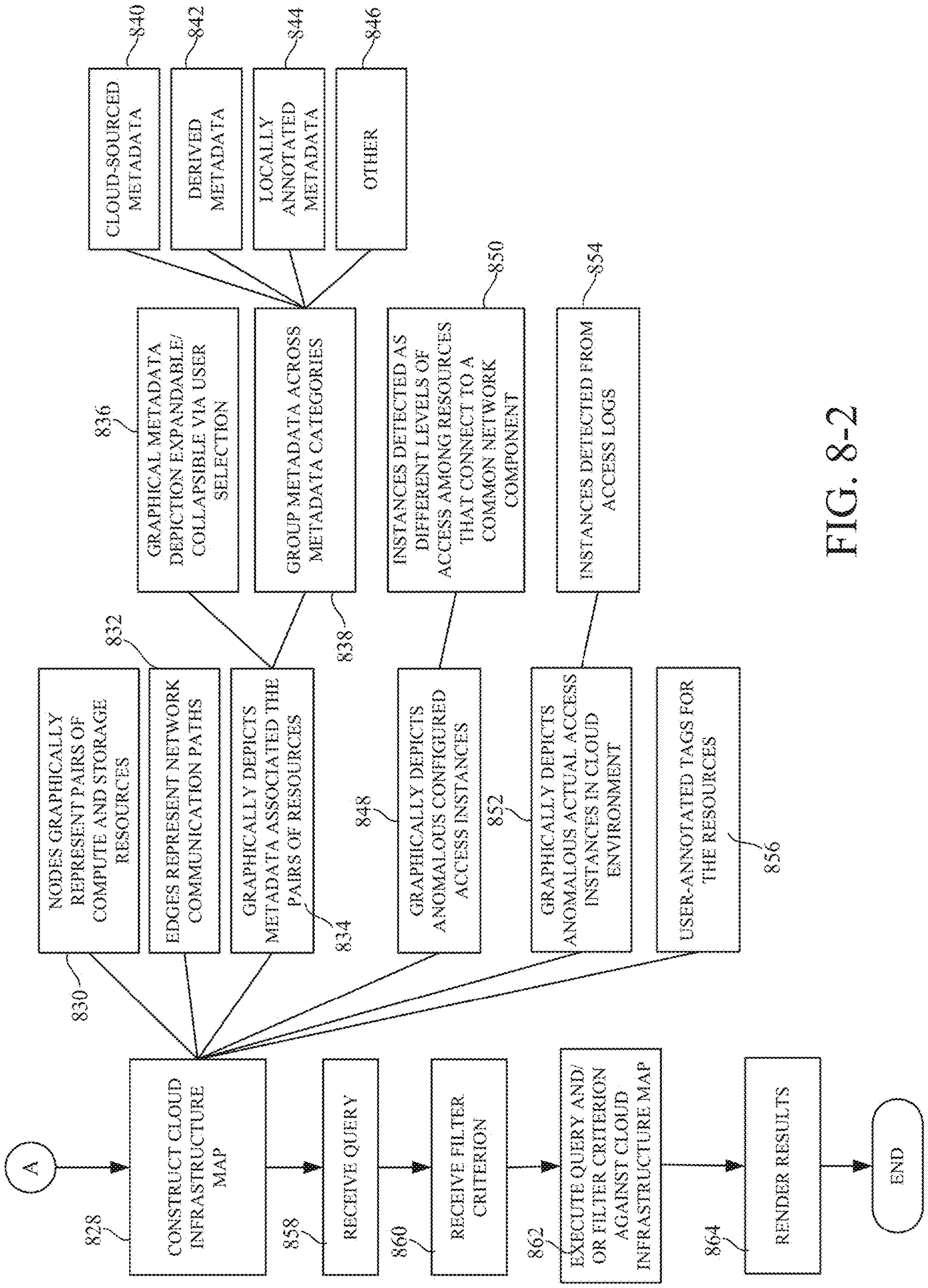

FIGS. 8-1 and 8-2 (collectively referred to as FIG. 8) provide a flow diagram 800 illustrating one example of infrastructure analysis and query execution. At block 802, permissions data and access control data for pairs of compute and storage resources is accessed. Policy data is accessed at block 804. For example, the policy data can include identity-based policies (block 806), resource-based policies (block 808), permissions boundaries (block 810), service control policies (SCP) (block 812), session policies (block 814) as well as other policies (block 816).

At block 818, network communication paths are traced between the pairs of resources. Tracing the network communication path can be based on the permissions data at block 820, the access control data at block 822, the policy data at block 824, and/or other data at block 826.

At block 828, a cloud infrastructure map is constructed. An example of a cloud infrastructure map includes nodes that graphically represent pairs of compute and storage resources (block 830), and edges that represent network communication paths between the resources (block 832). At block 834, the map graphically depicts metadata associated with the pairs of resources. For example, a graphical metadata depiction is expandable or collapsible via user selection, as represented at block 836. The metadata can be grouped across metadata categories at block 838, such as based on cloud-sourced metadata at block 840, derived metadata at block 842, locally annotated metadata at block 844, or based on other metadata categories at block 846.

The cloud infrastructure map can also graphically depict anomalous configured access instances at block 848. For example, block 848 can detect different levels of access among resources that connect to a common network component, as represented at block 850. At block 852, the map graphically depicts anomalous actual access instances in the cloud environment. For instance, the instances can be detected from access logs at block 854. User annotated tags for the resources can be depicted in the map at block 856 as well.

At block 858, a query is received. The query can include a search term, a content category, a data privacy policy, a temporal period, and can include other items as well.

Alternatively, or in addition, a filter criterion is received can be received at block 860. The filter criterion can be based on the metadata, based on applications running on at least one pair of resources, and/or based on one or more networks in the cloud environment.

The query and/or filter criterion are executed at block 862 and results are returned at block 864. For example, the query results can identify a subset of the pairs of resources that contain searched content.

Figure 9:
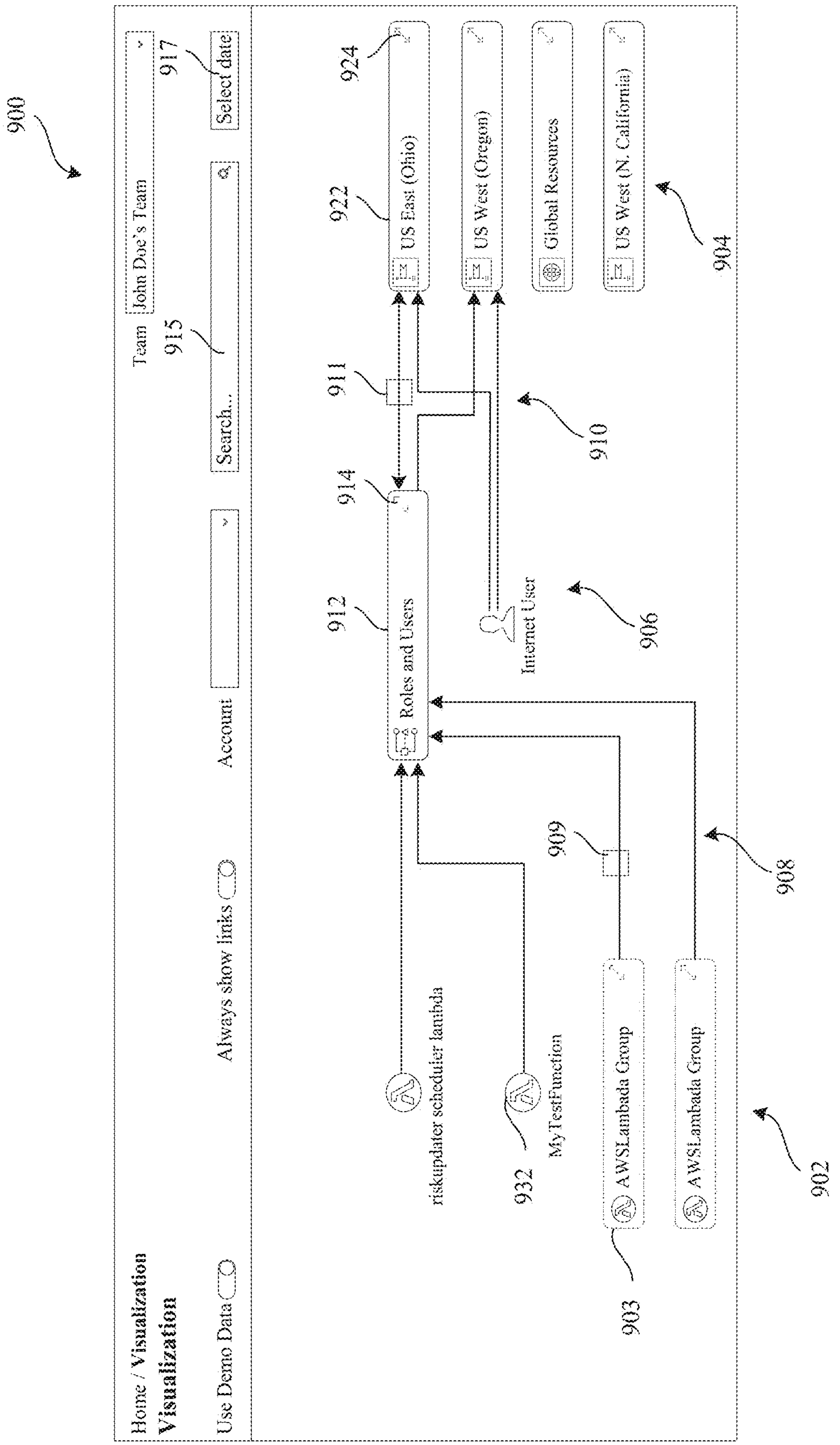
FIG. 9 illustrates an example user interface display.

FIG. 9 illustrates a user interface display 900 that includes a visualization of cloud infrastructure assets and relationships between those assets, such as access communication paths. The visualization in FIG. 9 can be rendered as a cloud infrastructure graph (e.g., map) that shows relationships between compute and storage resources and/or mappings between users, roles, and resources, based on the permissions data and the access control data. Further, the visualization can be augmented using sensitivity classification data to represent propagation of breach attack along communication paths.

As shown in FIG. 9, nodes 902 represent compute resources and nodes 904 represent storage resources. Illustratively, the storage resources include data stores or buckets within a particular cloud service. Nodes 906 represent roles and/or users. The links (e.g., access paths) or edges 908 between nodes 902 and 906 represent that compute resources that can access the particular roles represented by nodes 906. The edges or links 910 represent the storage resources that can be accessed by the particular roles or users represented by nodes 906.

Based on these relationships between compute and storage relationships, display elements can be rendered along, or otherwise visually associated with, the edges 908 and/or 910, to identify and graphically depict the propagation of breach attack. For instance, vulnerability display elements can be rendered in association with edges 908 and/or 910 to identify that a subject vulnerability signature (e.g., one or more risk signatures shown in FIG. 9) has been identified in the data, based on querying the permissions and access control data using the subject vulnerability signature. For example, display element 909 represents a risk signature between nodes 903 and 912 and display element 911 represents (such as by including a description, icon, label, etc.) a risk signature between nodes 912 and 922. Each display element 909, 911 can represent (such as by including a description, icon, label, etc.) corresponding likelihood and impact scores, can be actuatable to render details of the subject vulnerability, such as in a display pane on display 900. The details can include which risk signature has been matched, which sensitive data is at risk, etc.

Figures 1, 10:
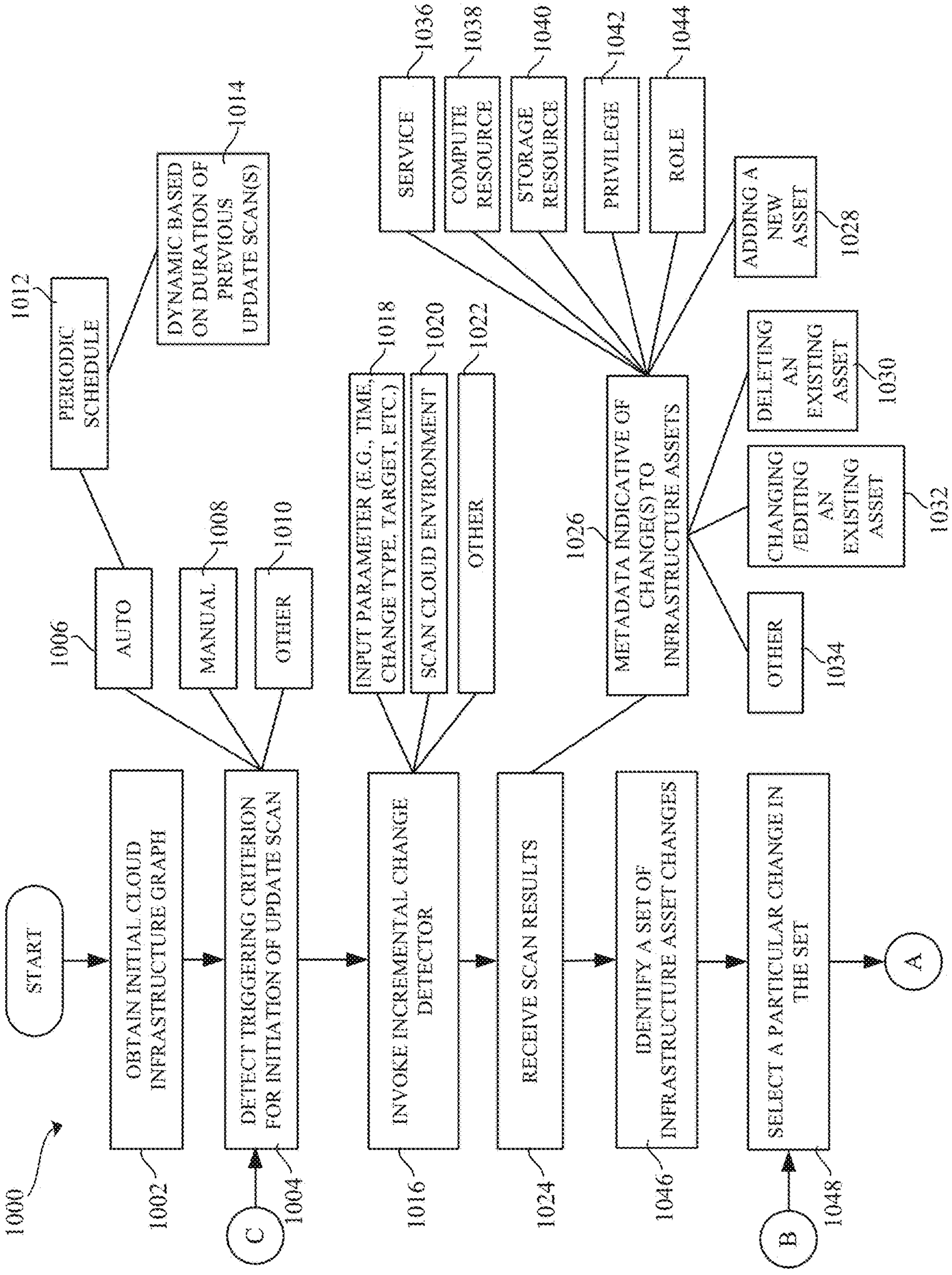
Figures 2, 10:
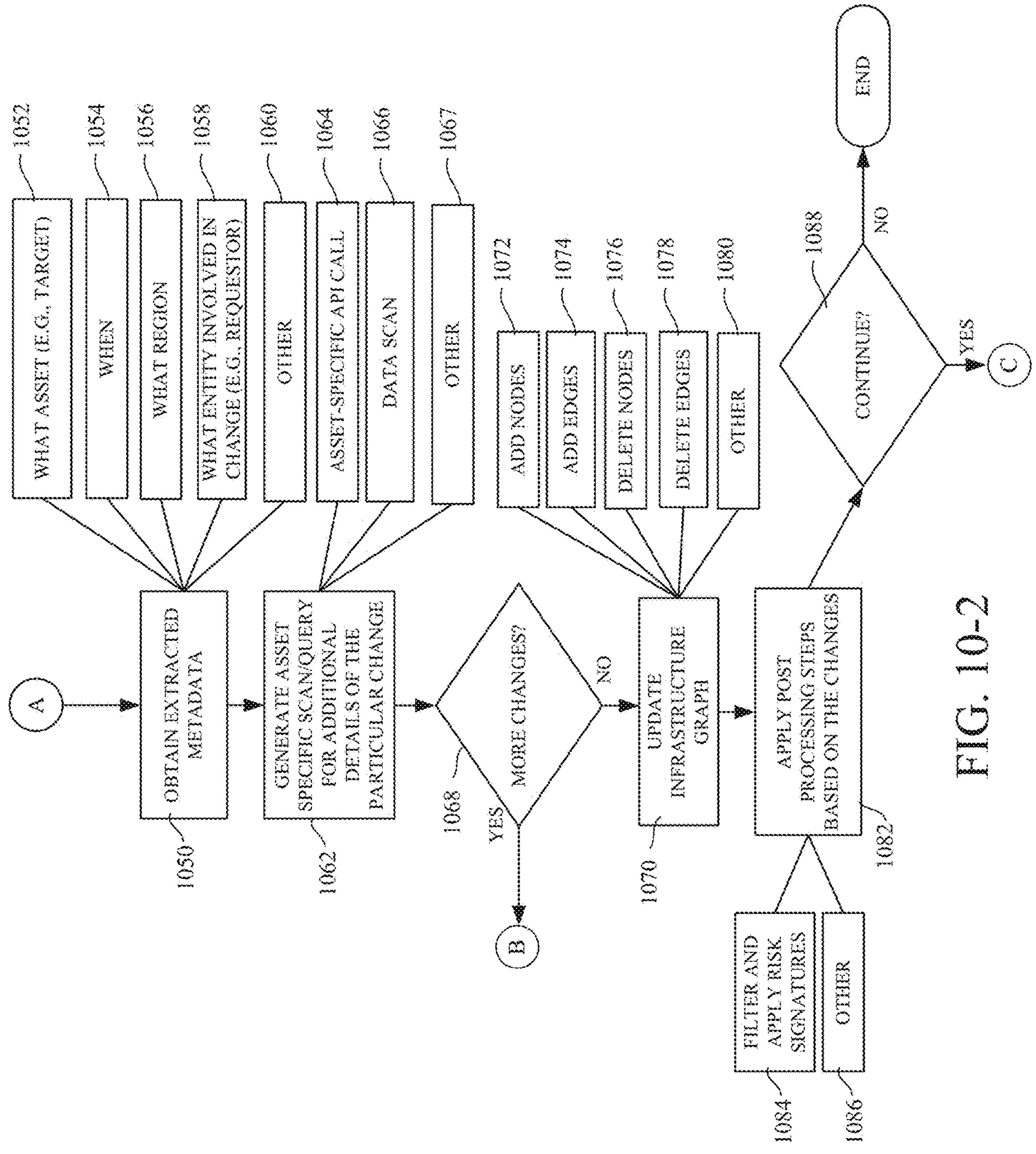

FIGS. 10-1 and 10-2 (collectively referred to as FIG. 10) provide a flow diagram 1000 of an example operation of infrastructure posture analysis using incremental change detection. For sake of illustration, but not by limitation, FIG. 10 will be discussed in the context of system 200 discussed above with respect to FIG. 3.

At block 1002, an initial cloud infrastructure graph is obtained. An example infrastructure graph includes nodes that represent resources in the cloud environment and edges, between the nodes, that represent relationships between the resources. Examples are discussed above with respect to FIGS. 8 and 9.

At block 1004, a triggering criterion for initiation of an update scan is detected. For example, the detection can be automatic at block 1006, manual at block 1008, or another type of input, as represented at block 1010.

In one example, the triggering of the update scan is performed automatically according to a periodic schedule, as represented at block 1012. For example, the update scan can be performed every x number of hours (e.g., one hour, two hours, three hours, etc.). In another example, the period schedule can define that a next update scan is to occur x number of minutes (e.g., fifteen minutes, etc.) after the previous scan has completed. In this way, the periodic schedule can be dynamic based on a duration of a previous update scan, as represented at block 1014.

An incremental change detector is invoked. One example of an incremental change detector is discussed below with respect to FIG. 11. Briefly, however, the incremental change detector can receive an input parameter at block 1018, such as a target time within which to detect changes in the cloud infrastructure. For example, the input parameter indicates a time at which a previous scan ended. In this way, the incremental change detector will identify any changes that occur since the last time the cloud infrastructure was scanned to update the infrastructure graph.

At block 1020, the cloud environment is scanned by the incremental change detector. The incremental change detector can invoked in other ways as well, as represented at block 1022.

At block 1024, scan results are received from the change detector. The scan results can include metadata received at block 1026, indicative of changes to one or more infrastructure assets. A change to an infrastructure asset can include, but are not limited to, the addition of a new asset (block 1028), the deletion of an existing asset (block 1030), the changing or editing of an existing asset (block 1032), or other types of changes (block 1034).

Further, the asset can include, but is not limited to, a particular service or service configuration, as represented at block 1036. An asset can include a compute resource (block 1038), a storage resource (block 1040), a privilege (block 1042), and/or a role (block 1044).

For sake of illustration, an example change indicates that a user y launched a new compute resource (e.g. a particular EC2 instance) of type z at a particular time t. The returned metadata can indicate the user, a unique identifier that identifiers the launched resource, and the type of the resource. The metadata can also indicate the roles and/or privileges given to that resource.

At block 1046, a set of infrastructure asset changes are identified based on the scan results. Based on the set of infrastructure asset changes, post processing steps can be constrained to the set of infrastructure asset changes. In this way, the post processing is not performed for the entire infrastructure posture, but the post processing is narrowly tailored to only the particular incremental changes detected during the current scan.

For example, at block 1048, a particular change in the set of infrastructure asset changes is selected and, at block 1050, the extracted metadata for that change is obtained.

The metadata extracted at block 1050 can include metadata identifying which infrastructure asset (e.g., the target of the event such as a particular storage resource) which is represented at block 1052. Alternatively, or in addition, the extracted metadata can identify when the event occurred (block 1054), which region the event occurred in (block 1056), which entity was involved in the change (block 1058) and can include other metadata (block 1060) as well. The entity involved in the change at block 1058 can include the identity of a particular requestor (a user, role, service, etc.).

At block 1062, an asset-specific scan and/or query is generated for additional details of the particular change. For example, an asset-specific API call can be generated to access the particular infrastructure asset that was the target of the particular change being analyzed. The call can be utilized, for example, to perform a data scan on the data in the resource, as represented at block 1064. For example, the data scan can identify which data profiles reside in the resource, such as sensitive data. Of course, the additional details for the particular change can be identified in other ways as well, as represented at block 1066.

At block 1068, the operation determines whether there are more changes in the set of infrastructure asset changes to be analyzed. If so, operation returns to block 1048 in which another change from the set is selected to obtain the extracted metadata and generate a scan or query for additional details on a particular change.

At block 1070, the infrastructure graph can be updated in a post processing step. An example of performing operations in an infrastructure graph is discussed above with respect to FIG. 8. Block 1070 can include similar features as those described with respect to FIG. 8.

Updating the infrastructure graph can include, for example, adding nodes at block 1072, adding edges at block 1074, deleting nodes at block 1076, deleting edges at block 1078, or other updates at block 1080. For example, the configuration represented by nodes and/or edges can be modified to represent changes in the infrastructure posture.

For sake of illustration, but not by limitation, if one of the events in the set of infrastructure asset changes identifies that a user added a new compute resource that is accessible by a compute resource with a particular role, a new node and edge can be added to the infrastructure graph to identify the new resource and relationship to the existing resource(s) identified in the graph.

At block 1082, other post processing steps can be applied based on the changes as well. For example, the post processing steps can include filtering a set of risk signatures to obtained a filtered set of risk signatures, and applying the filtered set of risk signatures at block 1084. Examples of block 1084 are discussed below with respect to FIG. 12. Briefly, however, block 1084 can include identifying attributes in the set of infrastructure asset changes, and determining which risk signatures are applicable to those assets. Block 1084 can include, but is not limited to, utilizing tags that identify the type of assets (whether the assets being changed are ECs instances, S3 buckets, RDS assets, etc.). Using this information, a set of risk signatures can be filtered into a reduced, filtered set of risk signatures, and only those risk signatures in the reduced set can be applied. Filtering the risk signatures before application to the infrastructure graph reduces processing time and load required to process the graph for matching risk signatures. Of course, other post processing steps can be performed at block 1086.

At block 1088, operation determines whether to continue by, for example, initiating a subsequent update scan based on triggering criteria detected at block 1004.

Figure 11:
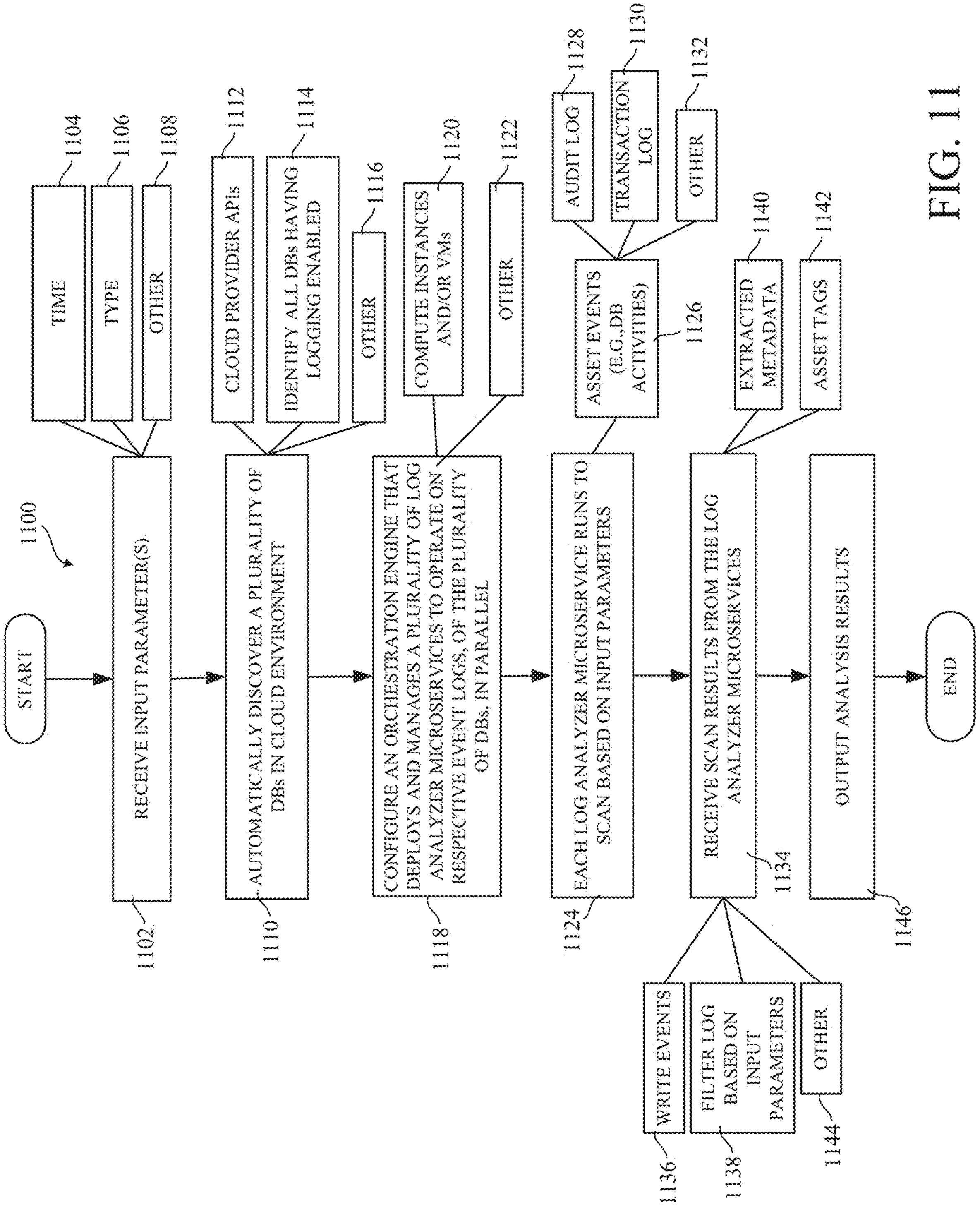
FIG. 11 is a flow diagram illustrating one example of invoking an incremental change detector.

FIG. 11 is a flow diagram 1100 illustrating one example of invoking an incremental change detector at block 1016.

At block 1102, input parameters are received. As noted above, the input parameters can include, but are not limited to, a temporal criteria at block 1104. For example, the temporal criteria can indicate a time that a previous scan ended and thus a beginning time instance for a time window within which to perform the incremental change detection. The input parameters can also indicate a type to detect changes, as represented at block 1106. Of course, other input parameters can be received as well, as represented at block 1108.

At block 1110, a plurality of target constructs are identified for which to perform log scanning. In one example, block 1110 includes discovering a plurality of databased in the cloud environment, such as by using cloud provider APIs at block 1112, and/or identifying databases having logging enabled at block 1114. Of course, the locations to scan for change detection can be performed in other ways as well, as represented at block 1116.

At block 1118, an orchestration engine is configured that deploys and manages a plurality of log analyzer microservices to operate on respective event logs. In one example, block 1118 includes operating on a plurality of respective event logs, in parallel, that correspond to a plurality of databases. The orchestration engine and/or log analyzer microservices can include compute instances and/or virtual machines at block 1120. For example, a serverless compute instance, such as a lambda instance, can be utilized. Of course, the plurality of log analyzer microservices can be deployed and managed in other ways as well, as represented at block 1122.

At block 1124, each log analyzer microservice runs to scan the corresponding event log(s) based on the input parameters received at block 1102. Block 1124 can include identifying the asset change events at block 1126, that match the input parameters. Examples of event logs that can be scanned include, but are not limited to, audit logs at block 1128, transaction logs at block 1130, or other types of logs at block 1132.

At block 1134, scan results are received from the log analyzer microservices. Block 1134 can include results that identify write events (block 1136) identified by the log analyzer microservices in the event logs. A write event includes activities such as creating a new resource, changing an existing resource, deleting a resource, etc. This is contrasted to a read event in which the activity includes only a data access.

At block 1138, the event log can be filtered based on the input parameters. In this way, the scan results received from the log analyzer microservice include filtered event logs received as extracted metadata at block 1140. Alternatively, or in addition, the scan result can include asset tags (block 1142), that provide information (such as resource type, etc.) of the assets that were changed. Of course, the scan results can be received in other ways as well, as represented at block 1144. At block 1146, analysis results are outputting based on the scan results.

Figure 12:
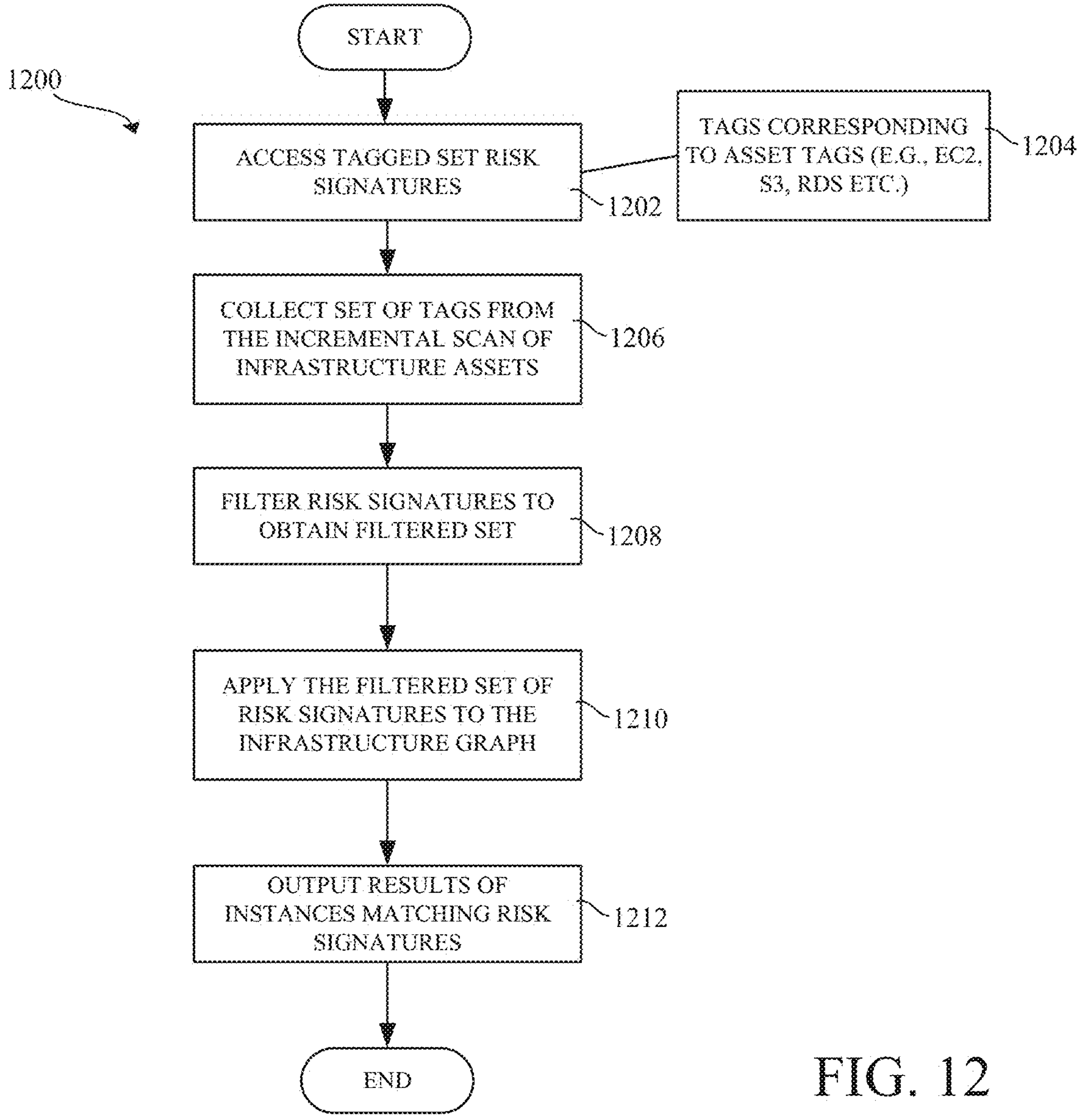
FIG. 12 is a flow diagram illustrating one example of filtering and applying risk signatures.

FIG. 12 is a flow diagram 1200 illustrating one example of filtering and applying risk signatures at block 1084. As represented at block 1204, the tags correspond to asset tags, such as identifying the types of resources to which a given risk signature is relevant.

Figure 13:
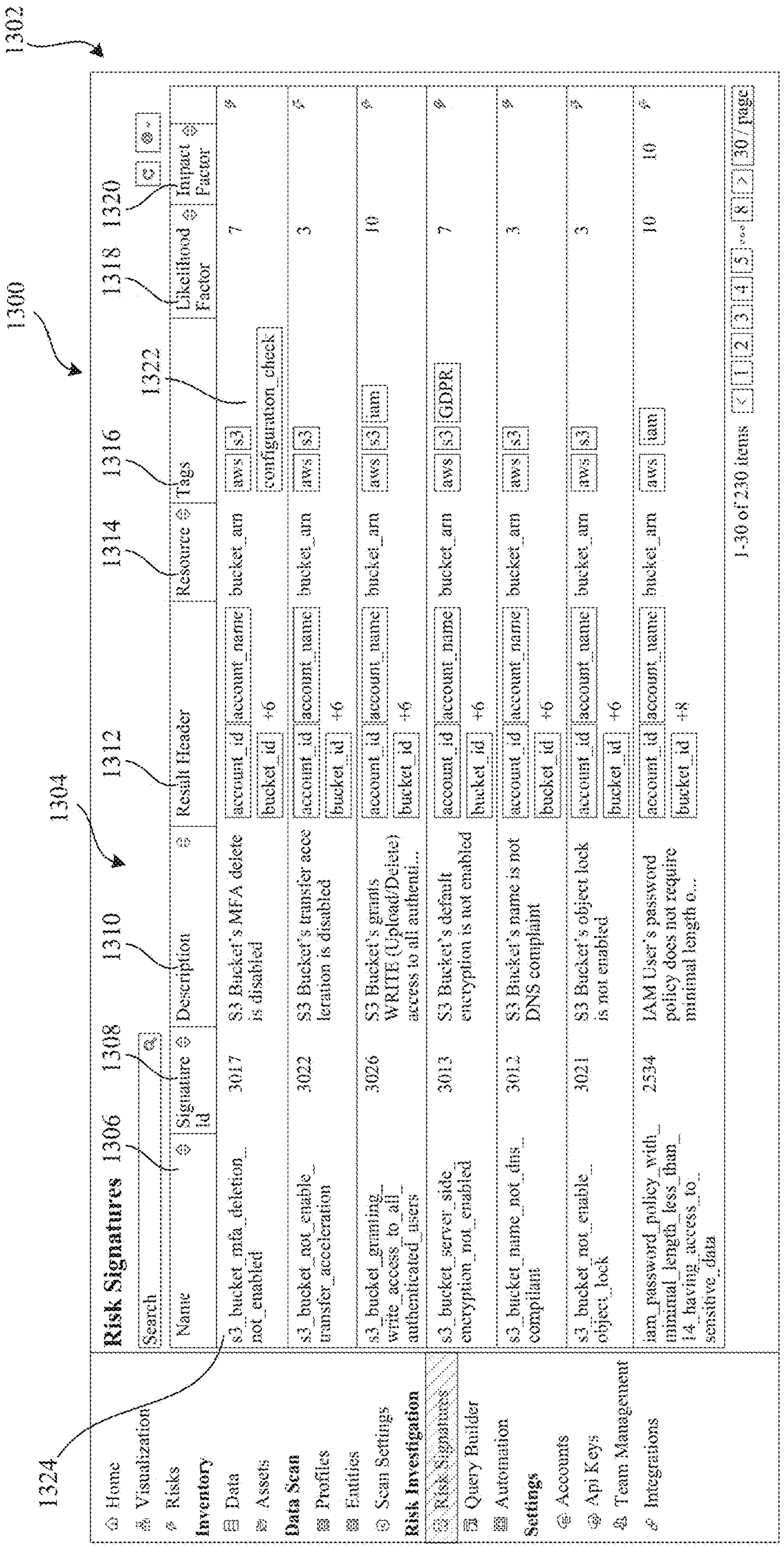
FIG. 13 illustrates one example of a user interface display that renders a set of tagged risk signatures.

At block 1202, a tag set of risk signatures is accessed. FIG. 13 illustrates one example of a user interface display 1300, that renders a set of tagged risk signatures. As shown in FIG. 13, display 1300 provides a searchable interface to access, modify, add, and/or delete risk signatures that can be applied to the cloud infrastructure posture. Each risk signature defines a set of criteria that the resources and data in the cloud environment can be queries upon to identify indications of vulnerabilities in the cloud service.

The example of FIG. 13 provides the set of tagged risk signatures in a tabular format, having a plurality of rows 1302 each representing a different risk signature. Each row includes a plurality of data fields or cells arranged in a plurality of columns 1304. The plurality of columns includes a name column 1306, a signature ID column 1308, a description column 1310, a result header column 1312, a resource column 1314, a tags column 1316, a breach likelihood factor column 1318, and a breach impact factor column 1320. Column 1306 includes a name of the given risk signature, uniquely identified by a signature ID in column 1308. The description column 1310 describes the risk signature, and the result header column 1312 identifies the information to be returned in results that match the risk signature. The tags column 1316 identifies one or more tags, for the given risk signature. The tags identify characteristics of the resources to which the risk signature applies. For example, the tags 1322 for risk signature 1324 indicate that the risk signature is applicable to S3 resources. This, of course, is for sake of example only.

Likelihood factor column 1318 indicates a likelihood factor that is assigned to the risk signature and an impact factor column 1320 indicates an impact factor assigned to the risk signature. The likelihood factor indicates a likelihood assigned to occurrence of the risk signature and the impact factor assigns an impact to the cloud service assigned to the occurrence of the risk signature. For sake of illustration, a likelihood factor of ten (out of a scale of ten) indicates that the vulnerability is likely to occur if the risk signature is identified in the cloud posture data, whereas a likelihood factor of one indicates a low likelihood. Similarly, an impact factor of ten (out of a scale of ten) indicates that the vulnerability is considered to have a high impact, whereas an impact factor of one indicates the vulnerability is considered to have a low impact on the cloud service.

Referring again to FIG. 12, at block 1206, a set of tags from the incremental scan of infrastructure resources is collected. For sake of example, assume that the operation described in FIG. 10 returns fifty asset changes that have occurred in the cloud infrastructure. Block 1206 analyzes these changes to identify the tags relevant to the resources involved in the changes. For instance, if the set of changes involved EC2 instances and S3 buckets, block 1206 returns the tags "S3" and "EC2."

At block 1208, the risk signatures are filtered to obtain a filtered set. To illustrated, in the above example where two tags "EC2" and "S3" are returned, block 1208 returns the risk signatures in the set of tagged risk signatures accessed at block 1202 that include at least one of the tags "S3" or "EC2." In other words, block 1208 operates to filter the collection of risk signatures to identify only those risk signatures that are tagged as applicable to the type of asset(s) involved in the changes.

Thus, when the risk signatures are applied at block 1210, only the filtered set of risk signatures is applied to the infrastructure graph, which reduces the processing expense and reduces processing latency in finding instances of matching risk signatures in the infrastructure graph.

At block 1212, results of the instances of matching risk signatures are outputted, for example in a user interface display. One example display is illustrated in FIG. 14.

Figure 14:
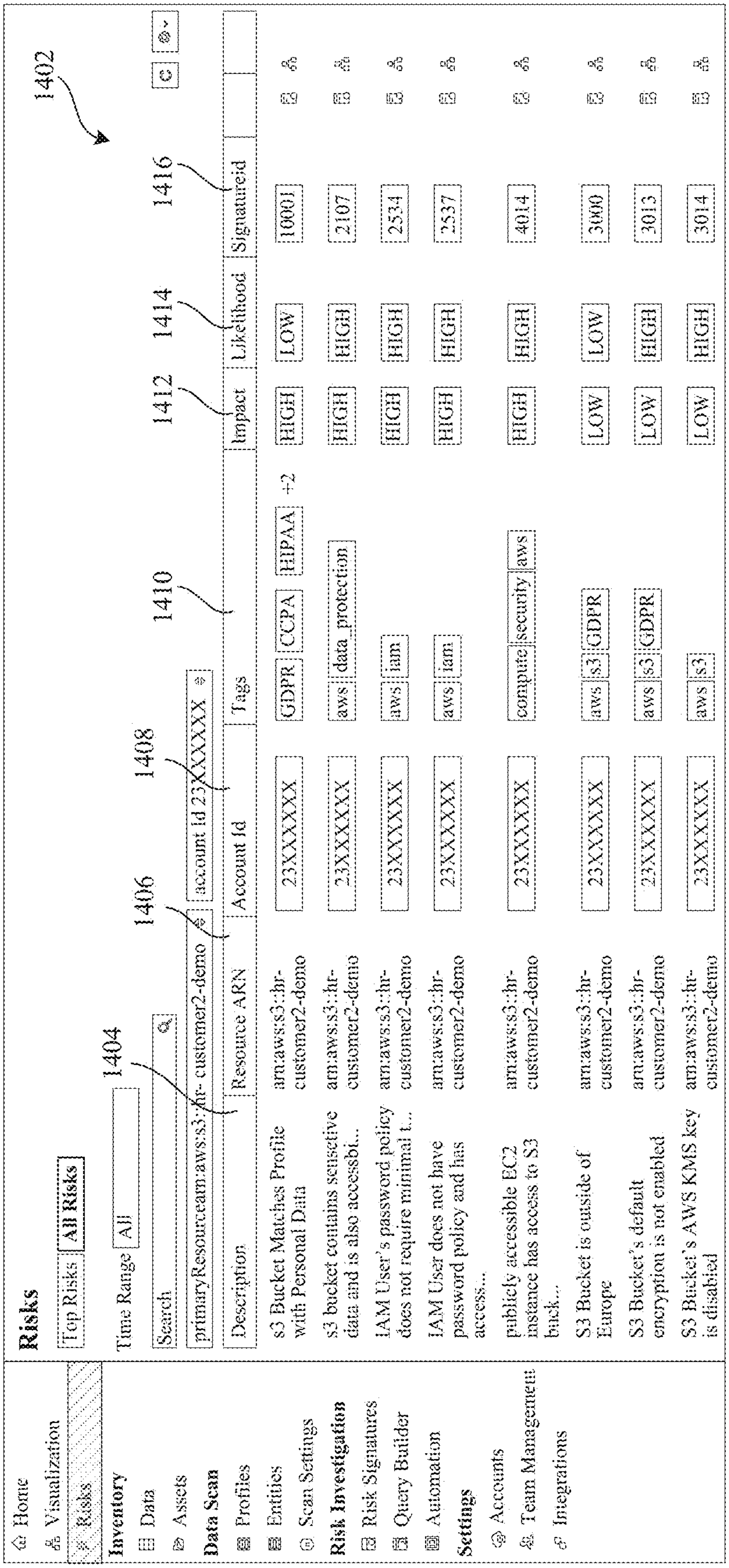
FIG. 14 illustrates one example of a user interface display that renders instances of matched risk signatures.

As shown in FIG. 14, display 1400 includes a plurality of rows 1402 that indicate matching instances of risk signatures. Each row includes a description field in column 1404, a resource name field in column 1406, an account ID field in column 1408, a tags field in column 1410, an impact field in column 1412, a likelihood field in column 1414, and a signature ID field in column 1416. The signature ID field in column 416 identifies the signature ID that was matched by the instance identified in the row. The tags field identifies which tags were matched between the infrastructure change and the risk signature that was matched for the given row.

Figure 15:
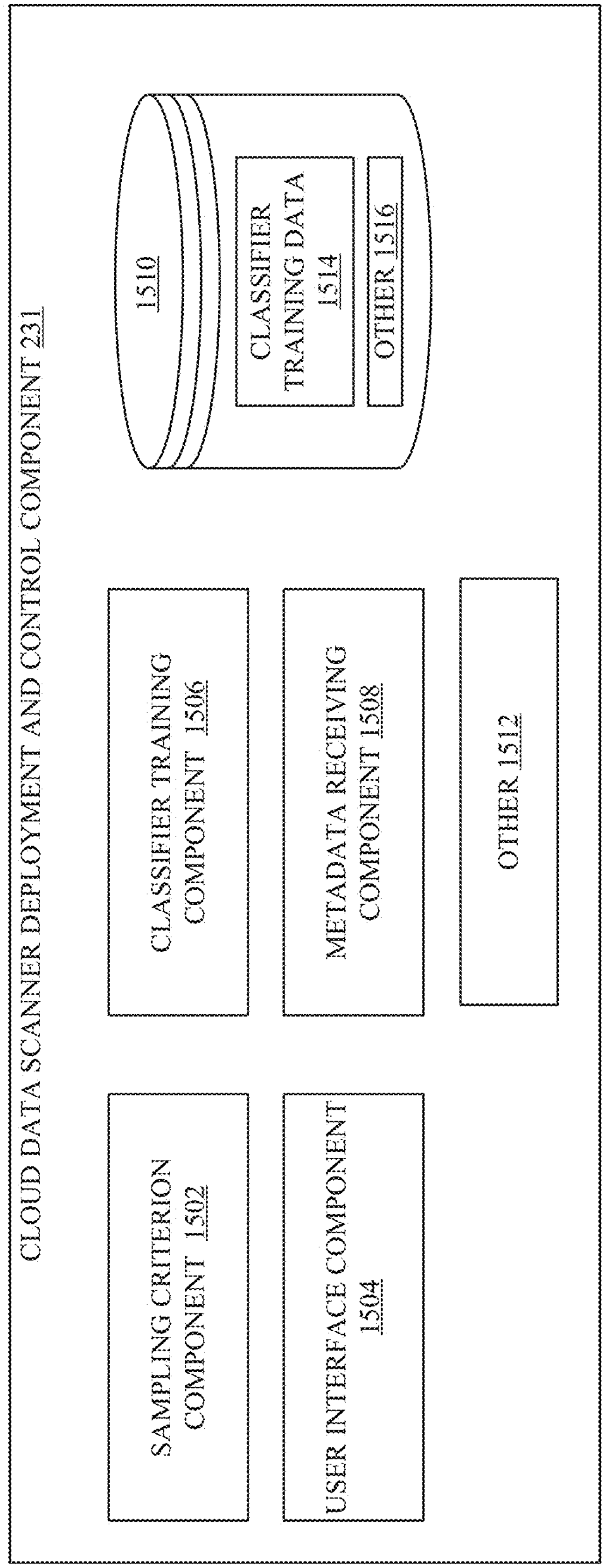
FIG. 15 is a schematic diagram illustrating one example of a cloud data scanner deployment and control component.

FIG. 15 illustrates one example of cloud data scanner deployment and control component 231. Component 231 includes a sampling criterion component 1502, a user interface component 1504, a classifier training component 1506, a metadata receiving component 1508, a data store 1510, and can include other items 1512 as well. Data store 1510 can store classifier training data 1514 and can store other items 1516 as well.

Training data 1514 illustratively includes target data profiles (also referred to as target data profiles or entities) that represent a collection of different data types. For example, training data 1514 can include sensitive data profiles, which can represent sensitive data types, patterns, and/or signatures. The sensitive data types can include personally identifiable information (PII), protected health information (PHI), payment card information (PCI), financial information, tax information, or other types of sensitive data types.

Examples include various types of financial data, such as, but not limited to, credit card numbers, bank account numbers, etc. Also, the training data 1514 can identify personal information, such as social security numbers, phone numbers, email addresses, etc.

For sake of illustration, but not by limitation, an example target data profile for an internet protocol (IP) address indicates a form "x.x.x.x", where x is an octet and must be a decimal value between zero and two hundred and fifty five. As another example, a target data profile for a credit card number indicates a string of fifteen or sixteen characters that begins with a three, four, or five.

Classifier training component 1506 is configured to train classifier 420 using training data 1514.

User interface component 1504 is configured to generate a user interface with user interface display elements and controls to configure the scanner to be deployed. For example, this can include input mechanisms that facilitate user selection of the sampling criterion used in scanning a data store.

Figure 16:
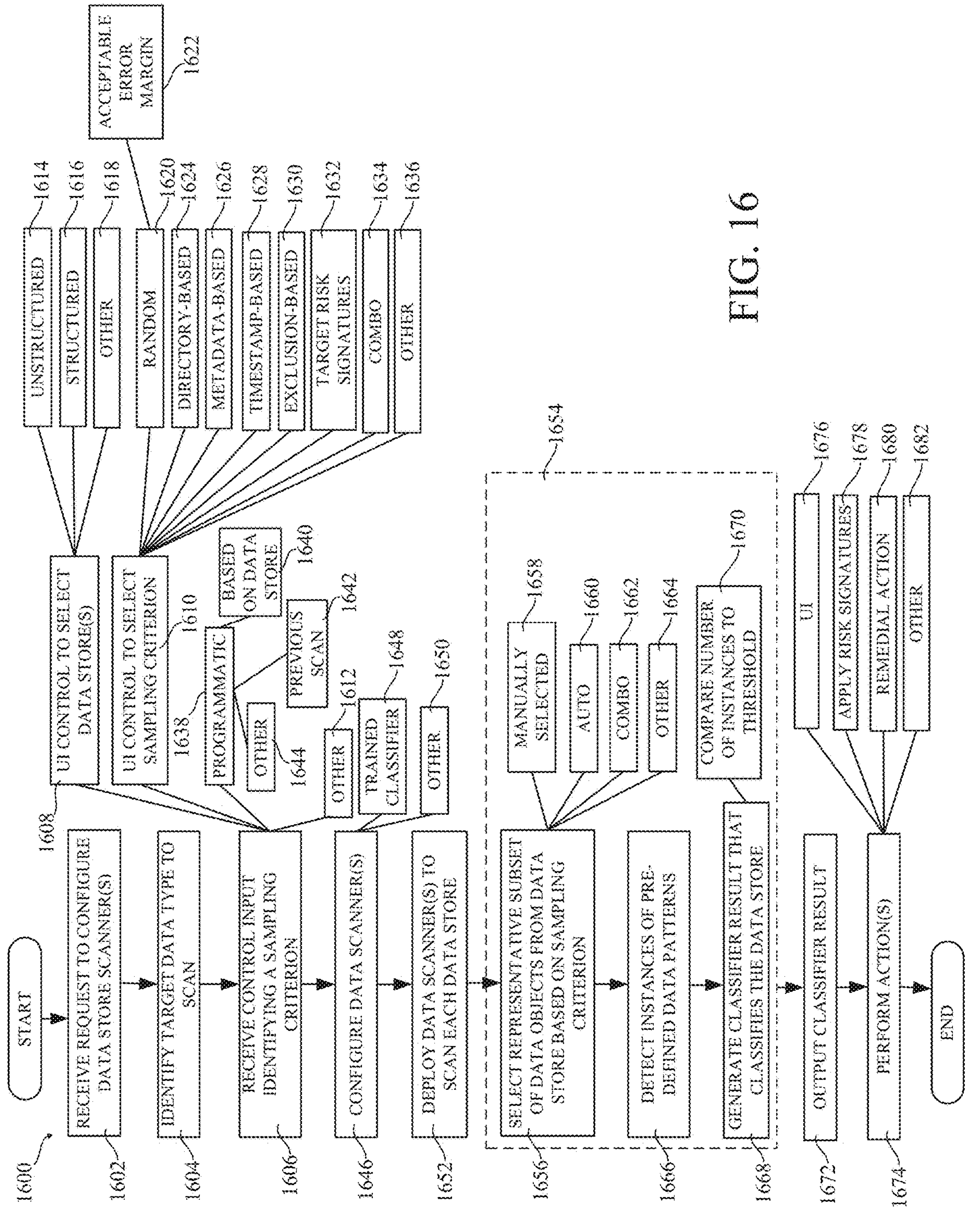
FIG. 16 is a flow diagram illustrating one example of configuring and deploying a data scanner on a data store using sampling criterion.

FIG. 16 is a flow diagram 1600 illustrating one example of configuring and deploying a data scanner on a data store using one or more sampling criterion. At block 1602, a request is received to configure one or more data store scanners. For example, the request can include receiving an on-boarding request to on-board a new cloud account, to add a new data to a cloud account, etc.

At block 1604, a target data type is identified to scan in the one or more data stores. The target data type can include, for example, a particular data pattern that represents sensitive and/or private information, such as the examples described above (e.g., PII data, PHI data, PCI data, financial information, tax information, etc.).

At block 1606, a control input identifying one or more sampling criterion is received. In one example, a user interface is generated and includes one or more user interface controls that are actuatable by a user to select a particular data store (block 1608), a user interface control that is actuatable to select a sampling criterion (block 1610), and/or other user interface elements (block 1612). Examples of user interface controls include, but are not limited to, checkboxes, radio buttons, dropdown lists, list boxes, buttons, toggles, text fields, date fields, breadcrumbs, sliders, search fields, paginations, sliders, tags, icons, etc.

The data store can include unstructured data stores (block 1614), structured data stores (block 1616), or other data stores (block 1618). Examples of unstructured data stores include, but are not limited to, S3 buckets, GCP blob containers, azure blob containers, etc.

The user interface control at block 1610 is actuatable to select one or more sampling criterion to be used in configuring the data scanner. Examples of the sampling criterion selected at block 1610 includes a random sampling criterion at block 1620. The random sampling criterion is used by the data scanner to randomly select a number of data objects (such as data files) to be scanned within the data store based on the total number of data objects in that data store. For example, the number of data objects to be sampled can be a defined percentage of the total number of data objects in the data store.

The number of data objects to be sampled can be defined based on a target (e.g., maximum acceptable) target error margin, as represented at block 1622. The target error margin can be selected through the user interface, or it can be identified programmatically, e.g., based on the size of the data store. Based on the selected target error margin, the number of data objects to sample from the data store can be identified through a lookup table. One example of a lookup table is shown below in Table 1.

TABLE 1

| Acceptable margin of | Size of population | | | | | |
|---|---|---|---|---|---|---|
| error | Large | 5000 | 2500 | 1000 | 500 | 200 |
| ±20% | 24 | 24 | 24 | 23 | 23 | 22 |
| ±15% | 43 | 42 | 42 | 41 | 39 | 35 |
| ±10% | 96 | 94 | 93 | 88 | 81 | 65 |
| ±7.5% | 171 | 165 | 160 | 146 | 127 | 92 |
| ±5% | 384 | 357 | 333 | 278 | 217 | 132 |
| ±3% | 1067 | 880 | 748 | 516 | 341 | 169 |

Through a user input mechanism, a user can select the target error margin for the scan, and the operation can determine the number of data objects to selected based on the size (e.g., total number of data objects) of the data store.

Another example of a sampling criterion is based on a hierarchical structure of data objects in the data store, as represented at block 1624. For example, in a data store, files are stored in a directory structure. The sampling criterion at block 1624 selects data objects to scan based on which directory those data objects reside on in the data store. For example, the sampling criterion can select the data objects to scan such that the scanned data objects are evenly distributed (or some other defined distribution) amongst all the directories in the data store. Alternatively, or in addition, the sampling criterion can define that at least one data object is to be scanned in each directory. This, of course, is for sake of example only.

Another example of a sampling criterion is a metadata-based sampling criterion (block 1626). The metadata-based sampling criterion selects data objects to sample based on metadata associated with those data objects. For example, the metadata can define object types (e.g., file types), tags and/or data object sizes (e.g., file sizes). For example, data objects can be ignored if they include metadata indicating similar characteristics as scanned data objects. In another example, the metadata-based sampling criterion selects data object such that there is at least one data object of each given object type that is selected.

Another example of a sampling criterion can include a timestamp-based sampling criterion (block 1628). The timestamp-based sampling criterion is configured to select the data objects to scan based on when each data object was last modified, as identified by its timestamp. In one example, the most recently modified data objects are selected first, for sampling.

Another example of a sampling criterion includes an exclusion-based sampling criterion (block 1630). The exclusion-based sampling criterion defines parameters for excluding certain data objects from the scan. For example, a user can select particular data object types, storage locations, directories, etc., to be ignored in the scan. For sake of illustration, if a user determines that a particular directory is used to store database event logs, and that such logs are not to be classified as sensitive, the user can define through an exclusion-based sampling criterion that the directory is to be skipped during scanning.

Another example of a sampling criterion includes a criterion based on one or more target risk signatures to be applied to identify instances of target risk events in the data store.

Further, as illustrated at block 1634, the sampling criterion can include a combination of two or more of the criteria illustrated at block 1620-1632. Of course, other sampling criterion can be utilized as well, as represented at block 1636.

Alternatively, or in addition to user input to select the data store and/or sampling criterion, the data store and/or sampling criterion can be programmatically selected or otherwise identified, as represented at block 1638. For instance, the sampling criterion can be identified based on the data store being scanned, as represented at block 1640. For example, based on a volume and/or type of data in the data store, a sampling criterion can be programmatically selected. Alternatively, or in addition, the sampling criterion can be selected based on a previous scan of the data store, as represented as block 1642. For instance, if a random sampling criterion was used in a previous scan of the data store, the same random sampling criterion can be used in one or more subsequent scans. In another example, a set of different sampling criterion can used rotatably, such that each subsequent scan of the data store uses a different sampling criterion than one or more prior scans of the store. Of course, the programmatic identification of the data store and/or sampling criterion can be performed in other ways as well, as represented at block 1644.

At block 1646, a data scanner is configured based on the selected sampling criterion. The data scanner can be configured by training a classifier (block 1648) using training data that defines target data profiles (e.g., examples of sensitive data). Of course, the data scanner can be configured in other ways as well, as represented at block 1650. At block 1652, the data scanner is deployed on each data store.

The data scanner operates to scan the data store, which is represented by block 1654. In instances in which multiple data stores are scanned by respective data scanners, the operations within block 1654 can be performed on each data store in parallel.

At block 1656, a representative subset of data objects is selected from the data store based on the sampling criterion. As noted above, the sampling criterion can be selected based on manual input (block 1658), automatically selected (block 1660), selected based on a combination of manual and/or automatic processes (block 1662), or selected in other ways as represented at block 1664.

At block 1666, instances of one or more pre-defined data patterns of the target data type are detected in the data store. For instance, block 1666 can identify a number of instances of sensitive and/or private data in the data store.

At block 1668, a classifier result that collectively classifies the data store based on the sampling of the representative subset is generated. In one example, the classifier on the number of detected instances of the pre-defined data patterns to a threshold, as represented at block 1670. In one example, the threshold can be set such that any number of detected instances of the target data type result in classification of the data store as having some correspondence to the target data type. For instance, a single instance of sensitive data in the data store can be utilized to classify the data store as having sensitive data. In another example, the threshold can be based on a percentage of the total number of data items in the data store. For example, the data store can be classified as sensitive if more than ten percent of the data items in the data store are identified as including sensitive data. This, of course, is for sake of example only.

At block 1672, the classifier results can be output and, at block 1674, one or more computing actions can be performed. In one example, at block 1676, a user interface display can be generated to render an indication of the classifier result. For instance, the user interface display can identify the data stores identified as having sensitive data can be generated.

At block 1678, risk signatures can be applied based on the classifier result. At block 1680, one or more remedial actions can be performed. In one example, an infrastructure graph can be generated or updated as discussed above. Of course, other actions can be performed, as represented at block 1682.

It can thus be seen that the present disclosure provides technology for data security posture analysis of a cloud environment. In some described examples, the technology implements intelligent data scanning sampling strategies, using sampling criterion, to identify a subset of data objects as being representative of a data store. A scanner analyzes only the representative subset of data object such that the data store is classified without having to scan the entire data set. This reduces the computational expense of data store classification while generating accurate classifications. Further, the data sampling is scalable as the data sets grow in size.

One or more implementations of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

Examples discussed herein include processor(s) and/or server(s). For sake of illustration, but not by limitation, the processors and/or servers include computer processors with associated memory and timing circuitry, and are functional parts of the corresponding systems or devices, and facilitate the functionality of the other components or items in those systems.

Also, user interface displays have been discussed. Examples of user interface displays can take a wide variety of forms with different user actuatable input mechanisms. For instance, a user input mechanism can include icons, links, menus, text boxes, check boxes, etc., and can be actuated in a wide variety of different ways. Examples of input devices for actuating the input mechanisms include, but are not limited to, hardware devices (e.g., point and click devices, hardware buttons, switches, a joystick or keyboard, thumb switches or thumb pads, etc.) and virtual devices (e.g., virtual keyboards or other virtual actuators). For instance, a user actuatable input mechanism can be actuated using a touch gesture on a touch sensitive screen. In another example, a user actuatable input mechanism can be actuated using a speech command.

The present figures show a number of blocks with corresponding functionality described herein. It is noted that fewer blocks can be used, such that functionality is performed by fewer components. Also, more blocks can be used with the functionality distributed among more components. Further, the data stores discussed herein can be broken into multiple data stores. All of the data stores can be local to the systems accessing the data stores, all of the data stores can be remote, or some data stores can be local while others can be remote.

As used herein, if a description includes "one or more of" or "at least one of" followed by a list of example features with a conjunction "or" between the penultimate example feature and the last example feature, then this is to be read such that (1) one example includes at least one of or one or more of each feature of the listed features, (2) another example includes at least one of or one or more of only one feature of the listed features, and (3) another example includes some combination of the listed features that is less than all of the features and more than one of the features.

As used herein, if a description includes "one or more of" or "at least one of" followed by a list of example features with a conjunction "and" between the penultimate example feature and the last example feature, then this is to be read such that the example includes at least one of or one or more of each feature of all the listed features.

As used herein, if a description includes "one or more of" or "at least one of" followed by a list of example features with a conjunction "and/or" between the penultimate example feature and the least example feature, then this is to be read such that, in one example, the description includes "one or more of" or "at least one of" followed by a list of example features with a conjunction "or" between the penultimate example feature and the last example feature, and, in another example, the description includes "one or more of" or "at least one of" followed by a list of example features with a conjunction "and" between the penultimate example feature and the last example feature.

The above discussion has described a variety of different systems, components, logic, and interactions. One or more of these systems, components, logic and/or interactions can be implemented by hardware, such as processors, memory, or other processing components. Some particular examples include, but are not limited to, artificial intelligence components, such as neural networks, that perform the functions associated with those systems, components, logic, and/or interactions. In addition, the systems, components, logic and/or interactions can be implemented by software that is loaded into a memory and is executed by a processor, server, or other computing component, as described below. The systems, components, logic and/or interactions can also be implemented by different combinations of hardware, software, firmware, etc., some examples of which are described below. These are some examples of different structures that can be used to implement any or all of the systems, components, logic, and/or interactions described above.

The elements of the described figures, or portions of the elements, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 17:
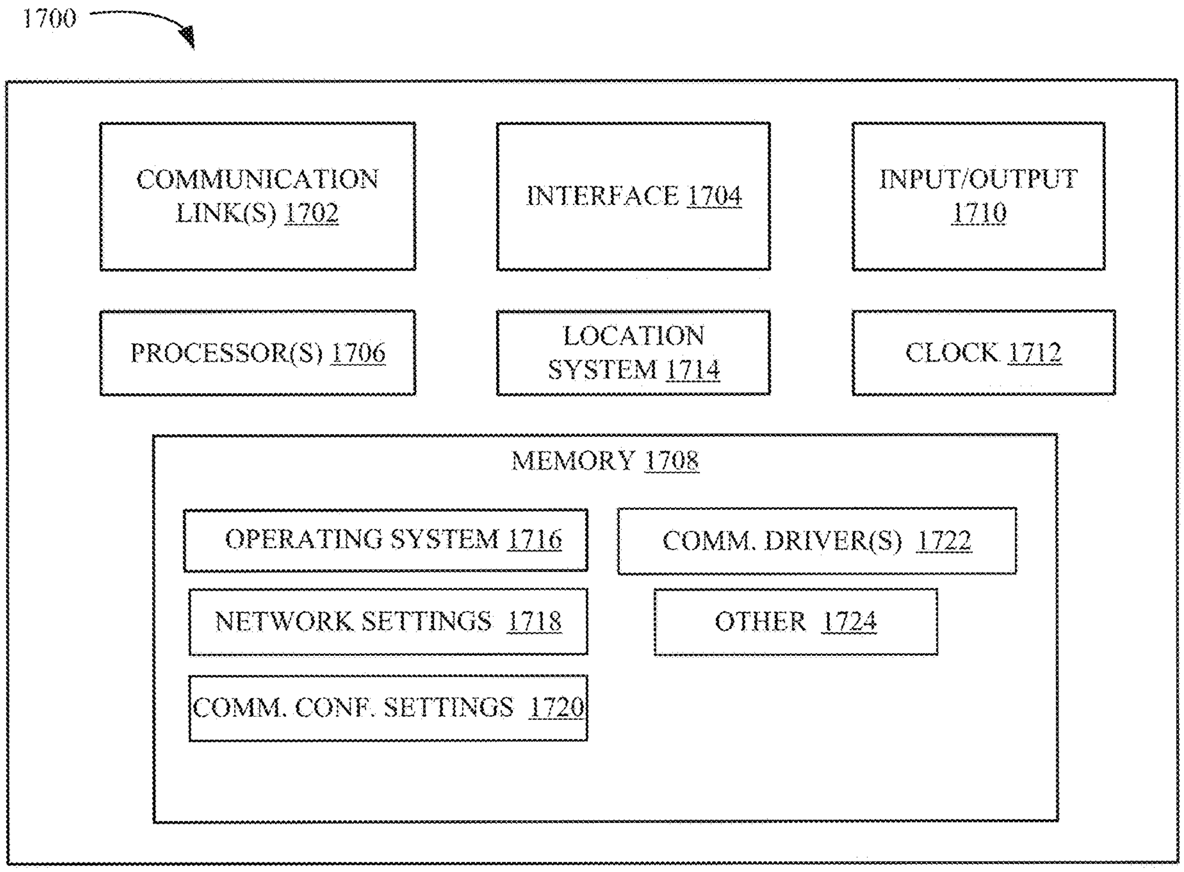
FIG. 17 is a simplified block diagram of one example of a client device.
Figure 18:
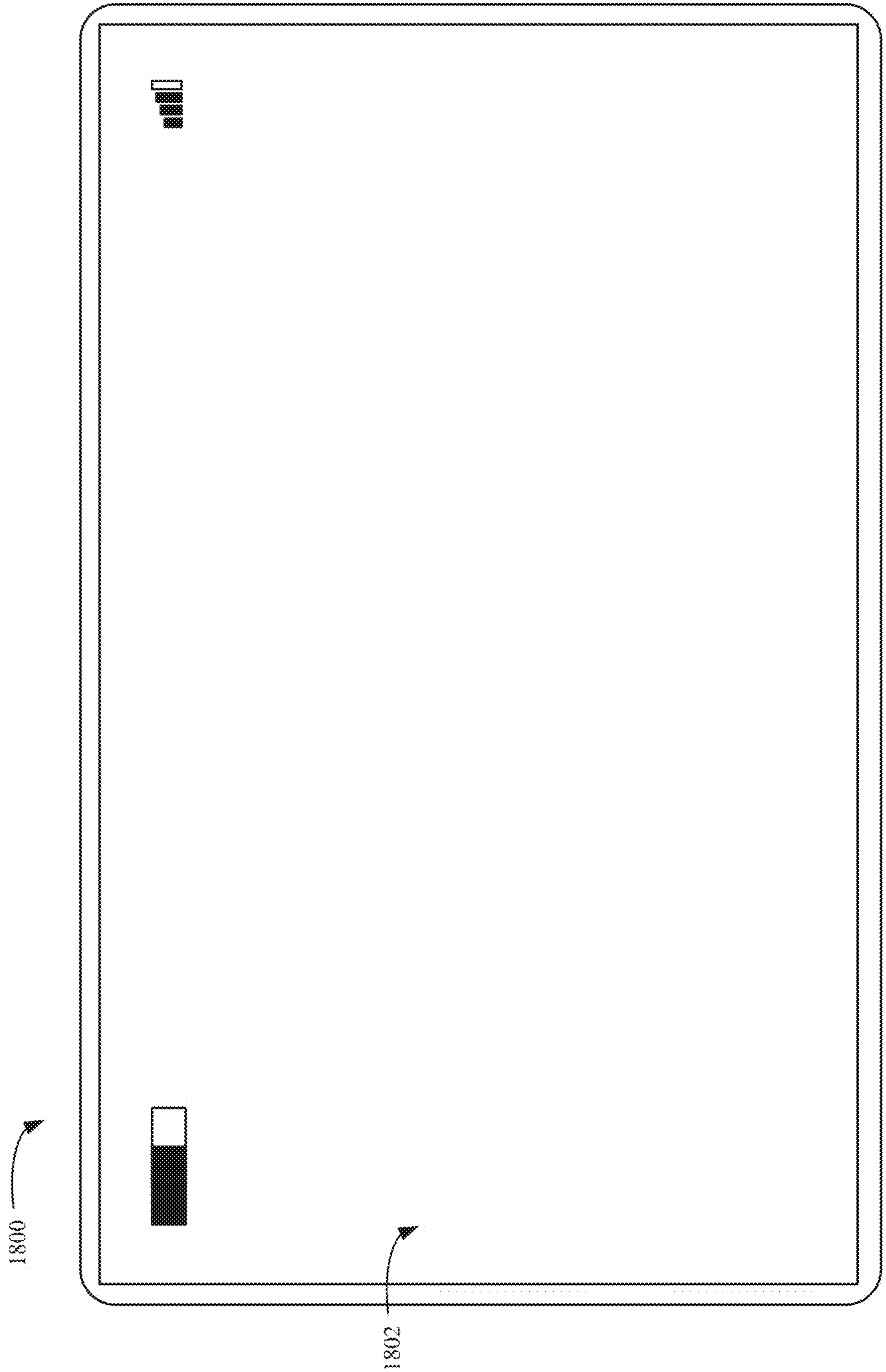
FIG. 18 illustrates an example of a handheld or mobile device.

FIG. 17 is a simplified block diagram of one example of a client device 1700, such as a handheld or mobile device, in which the present system (or parts of the present system) can be deployed. FIG. 18 illustrates an example of a handheld or mobile device.

One or more communication links 1702 allows device 1700 to communicate with other computing devices, and can provide a channel for receiving information automatically, such as by scanning. An example includes communication protocols, such as wireless services used to provide cellular access to a network, as well as protocols that provide local wireless connections to networks.

Applications or other data can be received on an external (e.g., removable) storage device or memory that is connected to an interface 1704. Interface 1704 and communication links 1702 communicate with one or more processors 1706 (which can include processors or servers described with respect to the figures) along a communication bus (not shown in FIG. 17), that can also be connected to memory 1708 and input/output (I/O) components 1710, as well as clock 1712 and a location system 1714.

Components 1710 facilitate input and output operations for device 1700, and can include input components such as microphones, touch screens, buttons, touch sensors, optical sensors, proximity sensors, orientation sensors, accelerometers. Components 1710 can include output components such as a display device, a speaker, and or a printer port.

Clock 1712 includes, in one example, a real time clock component that outputs a time and date, and can provide timing functions for processor 1706. Location system 1714 outputs a current geographic location of device 1700 and can includes a global positioning system (GPS) receiver, a LORAN system, a dead reckoning system, a cellular triangulation system, or other positioning system. Memory 1708 stores an operating system 1716, network applications and corresponding configuration settings 1718, communication configuration settings 1720, communication drivers 1722, and can include other items 1724. Examples of memory 1708 include types of tangible volatile and non-volatile computer-readable memory devices. Memory 1708 can also include computer storage media that stores computer readable instructions that, when executed by processor 1706, cause the processor to perform computer-implemented steps or functions according to the instructions. Processor 1706 can be activated by other components to facilitate functionality of those components as well.

FIG. 18 illustrates one example of a tablet computer 1800 having a display screen 1802, such as a touch screen or a stylus or pen-enabled interface. Screen 1802 can also provide a virtual keyboard and/or can be attached to a keyboard or other user input device through a mechanism, such as a wired or wireless link. Alternatively, or in addition, computer 1800 can receive voice inputs.

Figure 19:
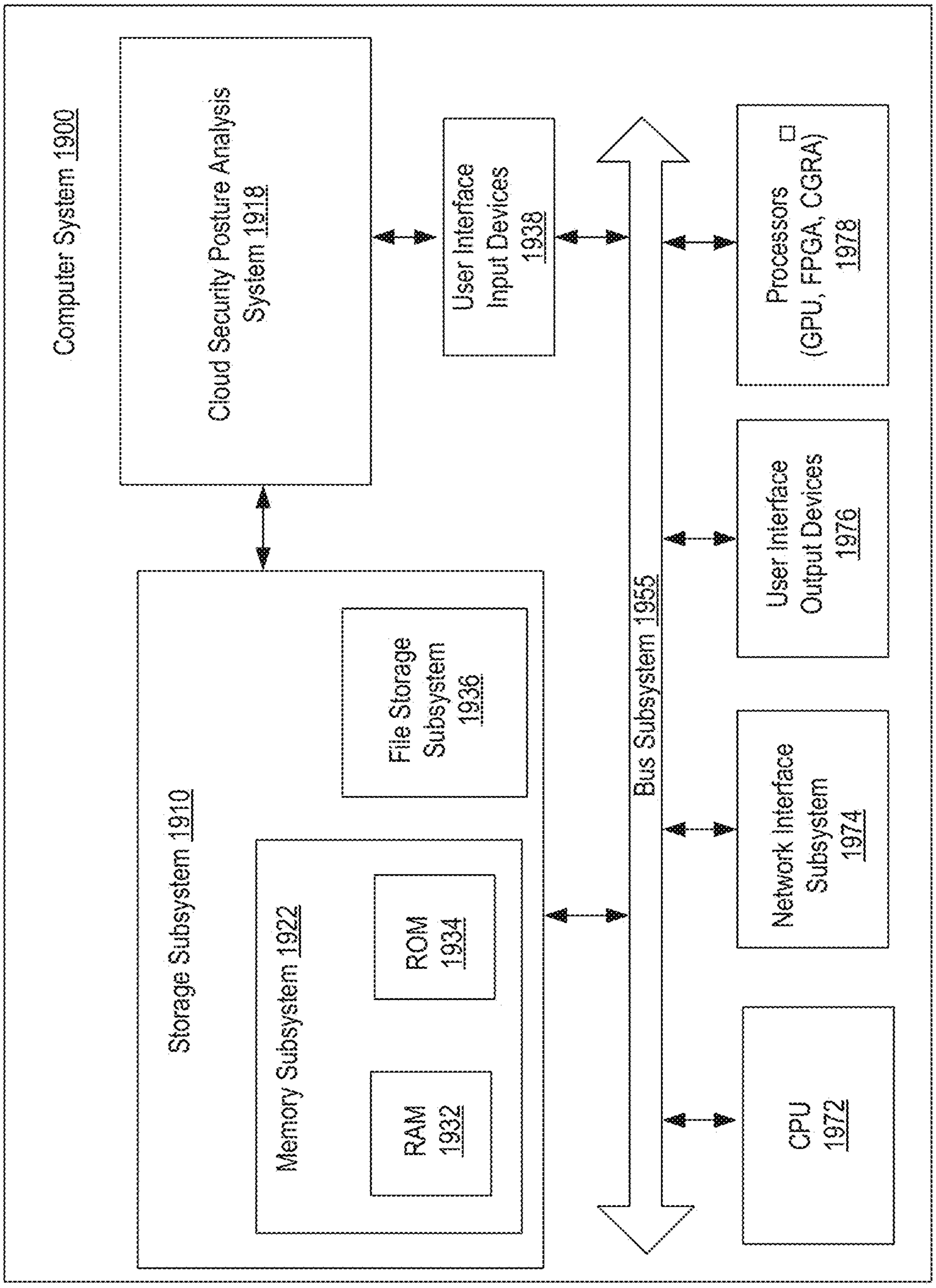
FIG. 19 shows an example computer system.

FIG. 19 shows an example computer system 1900 that can be used to implement the technology disclosed. Computer system 1900 includes at least one central processing unit (CPU) 1972 that communicates with a number of peripheral devices via bus subsystem 1955. These peripheral devices can include a storage subsystem 1910 including, for example, memory devices and a file storage subsystem 1936, user interface input devices 1938, user interface output devices 1976, and a network interface subsystem 1974. The input and output devices allow user interaction with computer system 1900. Network interface subsystem 1974 provides an interface to outside networks, including an interface to corresponding interface devices in other computer systems.

In one implementation, cloud security posture analysis system 1918 is communicably linked to the storage subsystem 1910 and the user interface input devices 1938.

User interface input devices 1938 can include a keyboard; pointing devices such as a mouse, trackball, touchpad, or graphics tablet; a scanner; a touch screen incorporated into the display; audio input devices such as voice recognition systems and microphones; and other types of input devices.

In general, use of the term "input device" is intended to include all possible types of devices and ways to input information into computer system 1900.

User interface output devices 1976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1900 to the user or to another machine or computer system.

Storage subsystem 1910 stores programming and data constructs that provide the functionality of some or all of the modules and methods described herein. These software modules are generally executed by processors 1978.

Processors 1978 can be graphics processing units (GPUs), field-programmable gate arrays (FPGAs), application-specific integrated circuits (ASICs), and/or coarse-grained reconfigurable architectures (CGRAs). Processors 1978 can be hosted by a deep learning cloud platform such as Google Cloud Platform™, Xilinx™, and Cirrascale™. Examples of processors 1978 include Google's Tensor Processing Unit (TPU)™, rackmount solutions like GX4 Rackmount Series™, GX50 Rackmount Series™, NVIDIA DGX-1™, Microsoft's Stratix V FPGA™, Graphcore™ Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1922 used in the storage subsystem 1910 can include a number of memories including a main random access memory (RAM) 1932 for storage of instructions and data during program execution and a read only memory (ROM) 1934 in which fixed instructions are stored. A file storage subsystem 1936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1936 in the storage subsystem 1910, or in other machines accessible by the processor.

Bus subsystem 1955 provides a mechanism for letting the various components and subsystems of computer system 1900 communicate with each other as intended. Although bus subsystem 1955 is shown schematically as a single bus, alternative implementations of the bus subsystem can use multiple busses.

Computer system 1900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1900 depicted in FIG. 19 is intended only as a specific example for purposes of illustrating the preferred implementations of the present invention. Many other configurations of computer system 1900 are possible having more or less components than the computer system depicted in FIG. 19.

It should also be noted that the different examples described herein can be combined in different ways. That is, parts of one or more examples can be combined with parts of one or more other examples. All of this is contemplated herein.

The technology disclosed can be practiced as a system, method, or article of manufacture. One or more features of an implementation can be combined with the base implementation. Implementations that are not mutually exclusive are taught to be combinable.

One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for classifying a data store in a computing environment, the computer-implemented method comprising:

identifying a first sampling criterion used for classification of the data store with respect to a target data type during a previous scan of the data store, wherein the data store stores a set of data objects;

selecting a second sampling criterion, from a plurality of sampling criteria, based on the first sampling criterion used during the previous scan;

deploying one or more scanners configured to select a subset of data objects, from the set of data objects stored in the data store, based on the second sampling criterion, wherein the subset comprises some, but not all, of the set of data objects;

generating a classification result based on a number of instances of the target data type in the subset of data objects; and performing a computing action based on the classification result.

2. The computer-implemented method of claim 1, wherein the second sampling criterion is different than the first sampling criterion.

3. The computer-implemented method of claim 2, wherein the second sampling criterion comprises at least one of:

a random sampling of the set of data objects from the data store;

a time stamp-based sampling of the set of data objects based on time stamps representing a last modified time for each data object a directory-based sampling of the set of data objects that is based on a directory structure in the data store;

a metadata-based sampling of the set of data objects that is based on metadata of the set of data objects, the metadata comprising one or more of object type, object tags, or object size; or an exclusion-based sampling criterion.

4. The computer-implemented method of claim 2, wherein the first sampling criterion selected a different subset of the data objects in the data store than the subset of data objects selected based on the second sampling criterion.

5. The computer-implemented method of claim 1, wherein generating the classification result comprises classifying the data store as having a threshold correspondence to the target data type.

6. The computer-implemented method of claim 5, wherein classifying the data store comprises determining that the subset of data objects includes a threshold number of instances of one or more pre-defined data patterns representing the target data type.

7. The computer-implemented method of claim 1, wherein the computing environment comprises a cloud environment.

8. A computing system comprising:

at least one processor; and memory storing instructions executable by the at least one processor, wherein the instructions, when executed, cause the computing system to:

select a first sampling criterion representing a first distribution of data objects in a data store;

select a second sampling criterion representing a second distribution of data objects in the data store;

deploy one or more scanners configured to select a set of the data objects, in the data store that satisfy both the first sampling criterion and the second sampling criterion;

obtain a scanner result, generated by the one or more scanners, that represents detected instances, in the set of the data objects, of one or more data patterns representing a target data type;

generate a classification result based on detected instances of the one or more data patterns; and perform a computing action based on the classification result.

9. The computing system of claim 8, wherein each sampling criterion, of the first sampling criterion and the second sampling criterion, comprises at least one of:

a random sampling criterion;

a temporal sampling criterion based on last modified time stamps of the data objects;

a directory-based sampling criterion based on a directory structure in the data store;

a metadata-based sampling criterion that is based on metadata of the set of data objects; or an exclusion-based sampling criterion.

10. The computing system of claim 8, wherein the first sampling criterion and the second sampling criterion are selected based on user input.

11. The computing system of claim 8, wherein the classification result identifies the data store as having a threshold correspondence to the target data type.

12. The computing system of claim 11, wherein the instructions, when executed, cause the computing system to determine that the set of data objects includes a threshold number of instances of the one or more data patterns.

13. The computing system of claim 11, wherein the one or more scanners are deployed in a cloud environment.

14. The computing system of claim 11, wherein first distribution of data objects is based on file type defined in metadata of the data objects.

15. A computer-readable media having computer-readable instructions stored thereon, wherein the computer-readable instructions, when executed by a computer, cause the computer to:

identify a subject vulnerability signature representing an access path to target data in a computing environment;

identify one or more characteristics associated with the target data;

generate a sampling criterion based on the one or more characteristics of the target data;

deploy one or more scanners configured to select a set of data objects in a data store based on the sampling criterion;

generate a classification result based on an analysis of data objects, in the set of data objects, relative to the target data, the classification result representing a classification of the data store as having correspondence to the subject vulnerability signature; and perform a computing action based on the classification result.

16. The computer-readable media of claim 15, wherein the one or more characteristics comprise a target data type.

17. The computer-readable media of claim 16, wherein the sampling criterion represents a distribution of the set of data objects based on the target data type.

18. The computer-readable media of claim 15, wherein the classification result identifies the data store as having a threshold correspondence to the target data.

19. The computer-readable media of claim 18, wherein the computer-readable instructions, when executed by a computer, cause the computer to:

determine that the set of data objects includes a threshold number of instances of the target data.

20. The computer-readable media of claim 15, wherein the computer-readable instructions, when executed by a computer, cause the computer to:

receive a user input that selects the subject vulnerability signature.

* * * * *